(12) United States Patent
Gallego et al.

(10) Patent No.: US 12,543,948 B2
(45) Date of Patent: Feb. 10, 2026

(54) APPARATUS AND A METHOD CONFIGURED FOR DETERMINING A CHOROIDAL TOPOGRAPHY OVER A REGION ON A RETINA

(71) Applicant: Carl Zeiss Vision International GmbH, Aalen (DE)

(72) Inventors: Augusto Arias Gallego, uml u+ee bingen (DE); Siegfried Wahl, Aalen (DE)

(73) Assignee: Carl Zeiss Vision International GmbH, Aalen (DE)

( * ) Notice: Subject to any disclaimer, the term of this patent is extended or adjusted under 35 U.S.C. 154(b) by 0 days.

(21) Appl. No.: 19/250,291

(22) Filed: Jun. 26, 2025

(65) Prior Publication Data
US 2025/0318725 A1    Oct. 16, 2025

Related U.S. Application Data

(63) Continuation of application No. PCT/EP2024/084723, filed on Dec. 4, 2024.

(30) Foreign Application Priority Data

Dec. 5, 2023 (EP) .................................... 23214332

(51) Int. Cl.
*A61B 3/10* (2006.01)
*A61B 3/00* (2006.01)
*A61B 90/00* (2016.01)

(52) U.S. Cl.
CPC .......... *A61B 3/1005* (2013.01); *A61B 3/0025* (2013.01); *A61B 3/0041* (2013.01); *A61B 90/36* (2016.02); *A61B 2090/366* (2016.02)

(58) Field of Classification Search
CPC ... A61B 3/1005; A61B 3/0025; A61B 3/0041; A61B 90/36; A61B 2090/366
(Continued)

(56) References Cited

U.S. PATENT DOCUMENTS 10,945,597 B2   3/2021  Walsh et al.
2007/0216867 A1* 9/2007  Campbell ........... A61F 9/00806
                                                351/246
(Continued)

FOREIGN PATENT DOCUMENTS

CN   116322471 A   6/2023
CN   116601550 A   8/2023
(Continued)

OTHER PUBLICATIONS

Delshad et al., "The time course of the onset and recovery of axial length changes in response to imposed defocus," Scientific Reports, vol. 10, No. 1, Art. 8322, May 20, 2020.
(Continued)

*Primary Examiner* — Mohammed A Hasan
(74) *Attorney, Agent, or Firm* — Qubit IP, PLLC

(57) ABSTRACT

An apparatus and a method for determining a choroidal topography over a region on a retina of an eye of a person are disclosed. The apparatus is also used to determine an effect of an ophthalmic lens design on the choroidal topography. The apparatus includes two individual displays, two optical transfer elements, a measuring device, and an optical filter. The displays provide a retinal stimulus and the optical transfer elements projects the retinal stimulus or a phase map to a region on a retina. The phase map contains a modified retinal stimulus. The measuring device images a choroidal topography over the region on the retina by capturing reflected light. The optical filter separates the reflected light from the projected phase map. Further, the (Continued)

second optical transfer element simultaneously projects the individual phase maps at a different retinal eccentricity to a peripheral region and a foveal region of the retina.

14 Claims, 7 Drawing Sheets

(58) Field of Classification Search
USPC .......................................................... 351/205
See application file for complete search history.

(56) References Cited

U.S. PATENT DOCUMENTS

| | | | |
|---|---|---|---|
| 2016/0038025 A1* | 2/2016 | Irsch | G02B 27/141 |
| | | | 351/215 |
| 2016/0270656 A1* | 9/2016 | Samec | A61B 5/398 |
| 2020/0081269 A1* | 3/2020 | Collins | A61B 3/14 |
| 2021/0059520 A1* | 3/2021 | Nankivil | A61B 3/032 |
| 2021/0177255 A1 | 6/2021 | Ohlendorf et al. | |
| 2021/0379399 A1* | 12/2021 | Buscemi | G02C 7/04 |
| 2023/0284897 A1 | 9/2023 | Kubota et al. | |
| 2024/0302677 A1 | 9/2024 | Giraudet et al. | |

FOREIGN PATENT DOCUMENTS

| | | |
|---|---|---|
| EP | 4 138 637 A1 | 3/2023 |
| WO | 2018165697 A1 | 9/2018 |
| WO | 2020102734 A1 | 5/2020 |
| WO | 2021005213 A1 | 1/2021 |
| WO | 2021259982 A1 | 12/2021 |

OTHER PUBLICATIONS

European Search Report issued in EP 23 214 332.1, to which this application claims priority, mailed May 24, 2024.

International Search Report and Written Opinion issued in PCT/EP2024/084723, to which this application claims priority, mailed Mar. 19, 2025.

Office Action by the Chinese Patent Office (SIPO) issued in CN 202480006236.8, which is a counterpart hereof, mailed on Sep. 16, 2025, and English-language machine translation thereof.

* cited by examiner

APPARATUS AND A METHOD CONFIGURED FOR DETERMINING A CHOROIDAL TOPOGRAPHY OVER A REGION ON A RETINA

CROSS REFERENCE TO RELATED APPLICATIONS

This application is a continuation application of international patent application PCT/EP2024/084723, filed on Dec. 4, 2024 and designating the U.S., which claims priority to European patent application 23 214 332.1, filed on Dec. 5, 2023, all of which are hereby incorporated by reference in their entireties.

TECHNICAL FIELD

The present disclosure relates to an apparatus and a method configured for determining a choroidal topography over a region on a retina of an eye of a person as well as to a use of the apparatus for determining an effect of at least one ophthalmic lens design on the choroidal topography.

BACKGROUND

A current treatment to slow myopia progression is wearing ophthalmic lenses aimed to increase choroidal thickness, thereby preventing an elongation of the eye. Contemporary lens designs produce different imaging properties for foveal and peripheral retina, since the latter plays a crucial role in myopia progression. Currently, the effectiveness of such lens designs is assessed via long-term clinical studies over years after a lens prototype has been provided.

S. Delshad, M. J. Collins, S. A. Read & S. J. Vincent, *The time course of the onset and recovery of axial length changes in response to imposed defocus*, Scientific Reports, 2020, 10:8322, provide evidence that the human eye is able to detect and respond to the presence and sign of blur within minutes. As generally known, the human eye is capable of responding to the presence of blur by changing its axial length, so that the retina moves towards a defocused image plane. The authors measured how quickly the eye length changed in response to both myopic and hyperopic defocus and how quickly the eye length changed when the defocus was removed. A rapid increase in axial length of +7±5 µm was observed after exposure of about 2 minutes to hyperopic defocus, while the reduction in axial length of −8±9 µm with myopic defocus, was slower and only statistically significant after 40 minutes. The eye length also recovered toward baseline levels during clear vision more rapidly following hyperopic than myopic defocus.

US 2016/0270656 A1 discloses configurations for a health system to be used in various healthcare applications, e.g., for patient diagnostics, monitoring, and/or therapy. The health system may comprise a light generation module to transmit light or an image to a user, one or more sensors to detect a physiological parameter of the user's body, including their eyes, and processing circuitry to analyze an input received in response to the presented images to determine one or more health conditions or defects.

WO 2018/165697 A1 discloses a method for measuring an influence of an ophthalmic lens design. The method comprises splitting an optical light beam into a wavefront measurement light path and a wavefront modulation light path; implementing the ophthalmic lens design in an adaptive optics device positioned in the wavefront modulation light path; and obtaining ocular biometric data in the ocular biometric and wavefront measurement light path to measure the influence of the ophthalmic lens design. Also disclosed are an apparatus and a system for measuring an influence of an ophthalmic lens design along with a method for assembling the device and system. The ocular biometric device may be an interferometer and the adaptive optics device may comprise one or more wavefront shapers.

WO 2020/102734 A1 discloses systems, e.g., a modified fundus camera system, and methods for measuring ocular distortion, the methods comprising projecting an image of a known target pattern having characteristic features onto an area of a retinal plane/surface to provide a distorted retinal image of the target pattern across the area of the retinal surface, recording the distorted retinal image of the target pattern using an image sensor to provide a captured distorted retinal image of the target pattern across the area of the retinal surface, identifying the characteristic features of the captured distorted retinal image, and comparing the identified characteristic features of the captured distorted retinal image of the target pattern across the area of the retinal surface to corresponding characteristic features of the known target pattern to provide a map of ocular distortion across the area of the retinal surface. Also provided are systems and methods for measuring retinal shape.

U.S. Pat. No. 10,945,597 B2, discloses an optical coherence tomography-based ophthalmic testing center system including an optical coherence tomography instrument comprising an eyepiece for receiving at least one eye of a user or subject; a light source that outputs light that is directed through the eyepiece into the user's or subject's eye, an interferometer configured to produce optical interference using light reflected from the user's/subject's eye, an optical detector disposed so as to detect said optical interference; and a processing unit coupled to the detector. The ophthalmic testing center system can be configured to perform a multitude of self-administered functional and/or structural ophthalmic tests and output the test data.

WO 2021/005213 A1 discloses a method, an apparatus, and a computer program for determining a refractive error of an eye of a user. The method for determining the refractive error of the eye of the user, wherein the eye of the user has a choroid, includes: ascertaining at least one value for a layer thickness of the choroid of the eye of the user over at least one region of the choroid; and determining a value for the change in the refractive error of the eye only from at least two values for the layer thickness of the choroid which were each ascertained at different times for the at least one region of the choroid, wherein the at least one region is selected from a nasal perifoveal region or a nasal parafoveal region.

US 2021/0379399 A1 discloses a stimulus configured to treat astigmatism with changes in retinal thickness, independently of, or in combination with, treatment for myopia. In some embodiments, a stimulus pattern is arranged with respect to an astigmatic axis of the eye to decrease ocular growth in relation to the astigmatic axis. In some embodiments, the apparatus is configured to direct light to regions of retina outside the macula in relation to the astigmatic axis of the eye. In some embodiments, the intensity is modulated to provide the effect. A lens, such as a contact lens or spectacle lens may be configured with a plurality of light sources, such as projection units having a light source and focusing optics that work together to project anteriorly or posteriorly defocused images onto the retina at locations eccentric to the fovea.

US 2020/081269 A1 discloses a method for measuring an influence of an ophthalmic lens design. The method comprises splitting an optical light beam into a wavefront measurement light path and a wavefront modulation light path; implementing the ophthalmic lens design in an adaptive optics device positioned in the wavefront modulation light path; and obtaining ocular biometric data in the ocular biometric and wavefront measurement light path to measure the influence of the ophthalmic lens design. Also disclosed are an apparatus and a system for measuring an influence of an ophthalmic lens design along with a method for assembling the device and system. The ocular biometric device may be an interferometer and the adaptive optics device may comprise one or more wavefront shapers.

WO 2021/259982 A1 discloses a device and a method for determining an ocular aberration of at least one eye of a user, the device comprising: a wavefront sensing unit designated for measuring at least one optical wavefront comprised by at least one light beam, wherein an ocular aberration of the at least one eye of the user is determined from the at least one optical wavefront; at least one diffractive element designated for generating multiple diffraction orders in the at least one light beam in two meridians such that the multiple diffraction orders are spatially separated on the wavefront sensing unit and in the at least one eye of the user.

SUMMARY

In particular with respect to the disclosure of US 2020/081269 A1, it is therefore an objective of the present disclosure to provide an apparatus and a method configured for determining a choroidal topography over a region on a retina of an eye of a person as well as a use of the apparatus for determining an effect of at least one ophthalmic lens design on the choroidal topography, which at least partially overcome the related art limitations.

It is a particular objective of the present disclosure to provide an apparatus and a method configured for determining short-term temporal changes in the choroidal due to an ophthalmic lens design. In addition, it would be desirable that the apparatus and the method could further be configured for reproducing the performance of the ophthalmic lens design for foveal and peripheral vision as well as for determining the choroidal topography over a short period of retinal stimulation, typically in a range of minutes, whereby short-term results obtained in this manner could be used for anticipating long-term effects, thus, allowing optimizing the ophthalmic lens design prior to clinical studies.

This problem is solved by an apparatus and a method configured for determining a choroidal topography over a region on a retina of an eye of a person as well as a use of the apparatus for determining an effect of at least one ophthalmic lens design on the choroidal topography, being configured to simultaneously project at least two individual phase maps at a different retinal eccentricity to each of at least two separate regions on the retina of the eye of the person. Exemplary embodiments, which can be implemented in an isolated fashion or in any arbitrary combination, are discussed throughout the following description.

In a first aspect, the present disclosure relates to an apparatus configured for determining a choroidal topography over a region on a retina of an eye of a person. Herein, the apparatus comprises:

at least two individual displays each configured for providing a retinal stimulus, thereby providing two independent retinal stimulus;

at least two optical transfer elements, comprising a first optical transfer element and a second optical transfer element, each configured for projecting at least one of the retinal stimulus or a phase map to a region on a retina of an eye of a person, wherein the phase map comprises a modified retinal stimulus;

a measuring device for capturing a choroidal topography over the region on the retina of the eye of the person by using reflected light received from the region on the retina of the eye of the person;

an optical filter configured for separating the reflected light received from the region on the retina of the eye of the person from the phase map projected to the region on the retina of the eye of the person, wherein the second optical transfer element is further configured for simultaneously projecting each of the at least two individual phase maps at a different retinal eccentricity to each of at least two separate regions on the retina of the eye of the person, wherein the separate regions comprise a peripheral region and a foveal region on the retina of the eye of the person.

As generally used, the term "apparatus" refers to a device having at least two elements which operate in manner that the desired purpose of the apparatus is achieved. Herein, the apparatus is configured for projecting a retinal stimulus to a region on a retina of an eye of a person and/or for determining a choroidal topography over the region on the retina of the eye of the person. For this purpose, the at least two elements of the apparatus may, typically, be comprised by a single device; however, in other embodiments, the elements may be distributed over different locations, wherein at least one communication element, such as at least one of a light beam, a solid optical component, or an electronic component, can be used for communication between locally separated elements.

According to the present disclosure, the apparatus may comprise a first module and a second module as described below in more detail, which communicate with each other in this manner; however, using a different type of arrangement may also be conceivable. As used herein, the term "module" refers to a particular element of the apparatus as described below in more detail. Herein, the terms "first" and "second" are considered as a description of a particular element without specifying an order or a chronological sequence and without excluding a possibility that other elements of the same type may be present. In a particularly exemplary embodiment, the first module may comprise the at least two optical transfer elements and at least one digitally addressable light modulation element, whereas the second module may comprise the measuring device and the optical filter; however, a different arrangement may also be feasible.

As indicated above, the apparatus comprises at least two optical transfer elements, which are configured for projecting a retinal stimulus and/or a phase map to a region on the retina of the eye of the person. As generally used, the term "projecting" or any grammatical deviation thereof refers to a process of displaying a light sheet onto an object, which is here the retina of the eye of the person. Instead of the term "person," a different term, such as "subject," "user," "test person" or "wearer of eye glasses," may also be applicable. As generally used, the term "retina" or any grammatical deviation thereof refers to a light-sensitive layer of tissue in the eye of the person, which is configured for recording an image from incident light. Herein, a lateral extent of the retina can exceed a retinal thickness by at least a factor of 10, typically of 20, particularly typically of 50. As further used herein, the term "optical transfer element" refers to an optical element, which is configured for altering at least one property of incident light, wherein the at least one property may, particularly, be selected from at least one of a direction of propagation, a bandwidth, a wavelength or a color of the light comprised by the sheet of light. In general, the at least one optical element may, particularly, be selected from a relay lens, a mirror, a cold mirror, a prism, a beam splitter, a rotating beam splitter, or a diffractive element, such as an optical grating. In contrast to a digitally addressable light modulation element, in particular a spatial light modulator as described below in more detail, the optical transfer element as used herein is not configured to change a phase of the light.

In an exemplary embodiment, the apparatus may comprise a first optical transfer element and a second transfer element, wherein the second optical transfer element may further be configured for simultaneously projecting each of the at least two individual phase maps at a different retinal eccentricity to each of at least two separate regions on the retina of the eye of the person. In this manner, the second optical transfer element enables a simultaneous measurement at a foveal region and a peripheral region, which is not possible according to the known related art. A third optical transfer element may further be employed when using a single digitally addressable light modulation element as described below in detail.

For the purpose of generating the phase map, the apparatus may, particularly preferred, comprise at least one digitally addressable light modulation element. As used herein, the term "generating" or any grammatical deviation thereof refers to a process of producing the phase map. As generally used, the term "map" refers to a two-dimensional representation of an object. Consequently, the term "phase map" refers to a two-dimensional representation of local values of a phase describing at least one property of a sheet of light, wherein the at least one property may, particularly, be selected from at least one an intensity, a polarization, or a color of the light comprised by the sheet of light. As used herein, the term "light" refers to electromagnetic radiation selected from at least one of visible light or infrared (IR) light. As generally used, the term "visible light" refers to electromagnetic radiation having a wavelength of 380 nm to 780 nm, while the terms "infrared light" and "IR light" refer to electromagnetic radiation having a wavelength above 780 nm to about 1000 µm, wherein near IR light having a wavelength above 780 nm to about 1.5 µm may, especially, be preferred.

As generally used, the term "digitally addressable light modulation element" refers to an optical device having a plurality of individually controllable optical elements designed for modulating an incident light beam. The digitally addressable light modulation element may, particularly, be configured to generate at least one phase map that modifies at least one image property of each of a retinal stimulus. Typically, the digitally addressable light modulation element may be selected from a spatial light modulator or a digital micro-mirror device. As generally used, the terms "spatial light modulator" or "SLM" refer to an optical device being configured for imprinting an intensity pattern or a phase pattern on an incident light beam in electronic and/or optical manner. Further, the terms "digital micromirror device" or "DMD" refer to an optical device being configured for modulating a digital image onto a light beam. For this purpose, the digital micro-mirror device comprises a plurality of tilted micro-mirrors having an edge length in the micrometer range and being arranged in a matrix, each micro-mirror being individually addressable by using electrostatic fields. In this manner, an incident light beam can be split into individual pixels and, subsequently, be reflected pixel by pixel. However, using a further types of digitally addressable light modulation element may also be feasible.

Accordingly, the digitally addressable light modulation element may be configured for generating the phase map by modifying at least one imaging property of a retinal stimulus. As used herein, the term "modifying" or any grammatical deviation thereof refers to a process of altering at least one property of an object. Herein, at least one imaging property of a retinal stimulus is altered by using the digitally addressable light modulation element, whereby the desired phase map is generated. As further used herein, the term "retinal stimulus" refers to a graphical presentation of a visual stimulus, which is known or reasonably expected by the person skilled in the art to be suitable for initiating a reaction of the retina of the eye of the person. The retinal stimulus may, particularly, be suitable if it is perceptible by the person, especially due to a contrast between the retinal stimulus and a background that allows the eye of the person to distinguish between the retinal stimulus and the background. Herein, the retinal stimulus is displayed in a manner that the reaction of the retina of the eye of the person comprises a difference between reflected light received from the region on the retina of the eye of the person and the phase map projected to the region on the retina of the eye of the person.

In accordance with the present disclosure, the apparatus may be configured for generating at least two individual phase maps. As used herein, the term "individual" refers to a particular object out of a plurality of objects, wherein each object may differ from each other object by at least one property, thus, generating mutually distinguishable objects. For the purposes of the present disclosure, the at least two individual phase maps may, therefore, be distinct from each other, especially by comprising at one element by which it can be distinguished from each other phase map, wherein the at one element may be selected from at least one of an intensity, a phase, a polarization, or a color of the light as comprised by the sheet of light which constitutes the individual phase map as defined above.

According to the present disclosure, at least one single digitally addressable light modulation element can be used. In one embodiment, at least two digitally addressable light modulation elements may be used to generate at least two phase maps from at least two retinal stimuli. In other words, each digitally addressable light modulation element is assigned to each retinal stimulus, respectively, and generates a respective phase map. That is, more than one single digitally addressable light modulation element is used only if it is desired to generate at least two phase maps from the at least two retinal stimuli at the same time. For an apparatus which is not configured to project at least two phase maps at the same time to the retina does not necessarily require more than one single digitally addressable light modulation element. In an embodiment, more than one single digitally addressable light modulation element can be used to induce axial changes with different wavelengths only, particularly since a performance of single digitally addressable light modulation elements, generally, depends on a wavelength, and an accurate generation of phase maps for different wavelengths may require different single digitally addressable light modulation elements having an optimized performance at each wavelength.

In one embodiment, the apparatus may comprise a single digitally addressable light modulation element, which may be configured for generating at least two of the individual phase maps, particularly, in a parallel manner. Further, the apparatus may, typically, comprise a third optical transfer element, which may be configured for providing at least two individual retinal stimuli to the single digitally addressable light modulation element, and a second optical transfer element which may further be configured for simultaneously projecting each of at least two individual phase maps at a different retinal eccentricity to each of at least two separate regions on the retina. The second optical transfer element is further configured for separating the at least two individual phase maps prior to be projected to one of at least two separate regions on the retina of the eye of the person. In one embodiment, the third optical transfer element and the second optical transfer element may comprise at least two mirrors or at least two optical lenses, typically selected from at least two single lenses or an array of multiple lenses, and at least one prism; however, a different configuration of the optical transfer element may also be feasible as long as the optical transfer element enables a simultaneous projection of the at least two phase maps to the at least two different regions on the retina at different eccentricities.

The present apparatus may further comprise a telescope. As generally used, the term "telescope" refers to an optical transfer element which is configured for guiding an optical path around an object. The telescopes may combine the paths of the light beams from the different modules and project them on at least two separate regions on the retina of the eye of the person. In particular, the telescopes may be used to conjugate pupil planes by replicating phase and amplitude of at least one wavefront at different positions. In one embodiment, the telescopes may comprise at least two parabolic mirrors or at least two achromatic lenses. Using such a telescope is particularly different to US 2020/0081269 A1 which does not require a telescope in front of the ocular biometric device since only a single location at the retina is stimulated and measured in a single measurement process, and no simultaneous stimulations of the foveal and peripheral retinal regions are intended. According to the present disclosure, two-dimensional eye fundus tomography is used by employing at least one telescope in the second module. In another embodiment, at least one telescope may be used only for a single module. In an alternative embodiment, both first and second modules may share components of a telescope in front of the eye.

Ocular aberration depends on the illumination's eccentricity and results in only limited retinal regions have uniform image properties. This region is also known as "isoplanatic patch" and typically is about 1°. Therefore, when projecting a single stimulus larger than 1° onto the retina, the programmed image properties can only be accurately reproduced within a disk approximately 1° in size. Within this disk, the image properties of the stimulus may vary unpredictably, leading to an increased variability of measurements and reduced reliability of the results. Further, accurately replicating this type of simultaneous stimulation while preserving the programmed image properties cannot be achieved by projecting a single beam into the eye. Further, it is noted that natural temporal variations in the choroid, such as caused by circadian rhythms, can degrade a reliability of conclusions drawn from stimulations conducted at different times. In contrast hereto, the apparatus according to the present disclosure enables simultaneous measurement at least two different regions by providing at least two stimuli by at least two individual displays and using at least one optical transfer element configured for simultaneously projecting each of at least two individual phase maps at a different retinal eccentricity to each of at least two separate regions on the retina and at least one telescope.

In a further exemplary embodiment, multiple chromatic retinal stimuli having independent image properties at at least two different wavelengths that may be projected on one of at least two separate regions on the retina of the eye of the person. For this purpose, multiple chromatic retinal stimuli may be generated, typically, by using one or more laser devices, such as laser diodes, and combined via temporal multiplexing, wherein at least one display can be configured to emit the retinal stimuli for at least two selected wavelengths. A combination of an optical element, such as a trichroic prism, and an optical filter, in particular a variable filter, can be used to guide respective portions of the monochromatic light beams to the at least one display and to a synchronization device configured to drive a time sequence of a monochromatic illumination at each selected wavelength, wherein the synchronization device may, further, be configured to trigger the at least one display and to address at least one digitally addressable light modulation element to project an intensity map of the multiple chromatic retinal stimuli and a corresponding phase map configured to modify its image properties for each selected wavelength. A dependency of a performance of the at least one digitally addressable light modulation element on a wavelength can be adjusted by projecting the phase map optimized to each wavelength after calibrating the phase modulation of the digitally addressable light modulation element at each selected wavelength.

In another embodiment, the light modulation element as comprised by the apparatus may be an individual digitally addressable light modulation element being configured for generating one of the at least two individual phase maps. Herein, an individual display may be configured for providing one individual retinal stimulus to the corresponding individual digitally addressable light modulation element. For this purpose, the apparatus, further, comprises at least two individual displays, wherein each individual display may be configured for providing at least one, typically one, individual retinal stimulus, wherein at least one of the imaging properties of each retinal stimulus may be modified by using the digitally addressable light modulation element for generating each individual phase map. In an exemplary embodiment, the individual display provides a single retinal stimulus. As used herein, the term "display" refers to an electronic device, which is designed for a presentation of the at least one individual retinal stimulus. In particular, the at least one display may be a screen or a monitor, especially comprising liquid crystals or digital micromirrors, which are configured for presenting the at least one individual retinal stimulus to the individual digitally addressable light modulation element. Further, the term "individual display" here refers to a intact device as a whole, and does not include separate screens on a single display such as a micro-display, which shows a plurality of different retinal stimuli on a single display. This is because a single display showing several stimuli would require additional optics and complicated configurations.

In this embodiment, the apparatus may, therefore, comprise at least two light modulation elements, in particular, a plurality of digitally addressable light modulation elements, especially at least two spatial light modulators, or at least two digital micro-mirror devices. Herein, the two light modulation elements may, typically, be oriented to generate multiple retinal stimuli having independent image properties. This feature is in contrast to US 2020/081269 A1 which merely discloses that the purpose of having multiple spatial light modulators is to induce axial changes with different wavelengths. This is based on the observation that the performance of the spatial light modulators depend on the wavelength, and an accurate implementation of phase maps for different wavelengths, thus, require different spatial light modulators having an optimized performance at a corresponding wavelength.

As indicated above, the apparatus is, in accordance with the present disclosure, configured for projecting each of the at least two individual phase maps to one of at least two separate regions on the retina of the eye of the person. Herein, at least one of the two separate regions is a peripheral region on the retina of the eye of the person beyond a fovea on the retina of the eye of the person. As generally used, the term "fovea" refers to a small central region on the retina of the eye of the person, which is designated for clear central vision. As used herein, the term "separate region" refers to an individual area on the retina, wherein two separate regions are distinguished by the respective areas on which an individual phase maps is projected. As particularly preferred, two separate regions do not overlap each other. By way of example, a first individual phase map is projected on a central region on the retina comprising the fovea, while a second individual phase map is also projected on the retina of the eye of the person but on a peripheral region which does not include the fovea.

For a purpose of generating the first individual phase map to be projected on the central region on the retina comprising the fovea, at least one central retinal stimulus may be used, typically selected from at least one of:
 a static image of an object;
 a movie;
 a spatially regular pattern,
wherein the image, the movie, or the pattern may be monochromatic or colored. In contrast hereto, at least one peripheral retinal stimulus may be used for a purpose of generating the second individual phase map to be projected on a peripheral region which does not include the fovea, wherein the at least one peripheral retinal stimulus may, typically, be selected from at least one of:
 a spatially regular pattern;
 a static image of an object;
 a movie,
wherein the pattern, the image, or the movie may be monochromatic or colored. However, using a further type of central retinal stimulus or peripheral retinal stimulus may be feasible.

In a particularly exemplary embodiment, the second optical transfer element may be configured for simultaneously projecting each individual phase map to more than one of the at least two separate regions on the retina of the eye of the person at different eccentricities. As generally used, the term "simultaneously" refers to performing two processes in a manner that at least a portion of both processes is performed at the same time interval. Especially, the at least one optical transfer element may be configured for projecting each individual phase map at a different retinal eccentricity to each separate region on the retina of the eye of the person. As generally used, the term "retinal eccentricity" refers to an angle between two light beams, each beam comprising an individual phase map to be projected as a light sheet on the retina. In a particular embodiment, the at least one optical transfer element may be configured for projecting at least one of the at least two individual phase maps at a fixed retinal eccentricity. In a related art apparatus which does not presume simultaneous measurement at foveal and peripheral regions no such optical transfer elements are necessary.

As generally used, the term "fixed" refers to a constant value, which is not altered during a predefined time interval. In a preferred alternative embodiment, the at least one optical transfer element may be configured for projecting at least one of the at least two individual phase maps at a variable eccentricity. As generally used, the term "variable" refers to a value, which is subject to be altered during a predefined time interval. In this alternative embodiment, the second optical transfer element is configured for projecting each of at least two individual phase maps simultaneously at a different retinal eccentricity to each of at least two separate regions on the retina. Herein, the second optical transfer element may be or comprise a rotational beam splitter (RBS) which may be configured for projecting at least one light beam at a particular eccentricity on the retina of the eye of the person. As generally used, the term "beam splitter" relates to a particular kind of optical element which is designated for splitting a light beam into at least two, in particular exactly two, partial light beams. Herein, the beam splitter can, in general, be selected from any known beam splitter, in particular from a glass plate or a cube having a dielectric coating, a dichroic mirror, a pellicle beam splitter, or a polarizing beam splitter, such as a Wollaston prism, or a polarization grating. However, using a different type of optical transfer element may also be feasible.

In an alternative embodiment as described below in more detail, the apparatus may, further, comprise at least one refractive correction element, which may, typically, be a non-pixelated correcting element. This at least one refractive correction element may be configured for generating one of the at least two individual phase maps. As used herein, the terms "refractive correction element" or "non-pixelated correcting element" refer to an optical element having a predefined visual correction, in particular indicated in ±diopters. Generally, a field-of-view (FOV) of a pixelated digitally addressed light modulation element, such as a spatial light modulator, is limited, particularly since millions of pixels in rectangular or square arrangements may create replica of the images viewed through the pixels, which may overlap as they increase. Therefore, using a pixelated digitally addressed light modulation element was considered in the related art not to be suitable for generating a phase map of a wide field-of-view (FOV) stimulus. In contrast thereto, the non-pixelated correcting element is used herein for generating a phase of a wide FOV stimulus. Typically, the at least one refractive correction element, in particular the at least one non-pixelated correcting element, may be at least one deformable mirror, a single optical lens, or a set of optical lenses, typically at least one solid optical lens or at least one tunable liquid lens; however using a different type of optical elements may also be feasible.

As already indicated above, the apparatus further comprises a measuring device, which is configured for capturing a choroidal topography over the region on the retina of the eye of the person. As generally used, the terms "choroid" and "choroidal" refer to an intermediate layer that is arranged between a sclera and the retina, in particular between the sclera and a retinal pigment epithelium, on the side of the eye distant from the entrance of light. What emerges from this type of arrangement of the choroid in the eye is that the thickness of the choroidal layer is delimited by the respectively adjoining sclera and retina, in particular the sclera and the retinal pigment epithelium. The term "thickness of the choroidal layer" within the scope of the present disclosure denotes a distance between the sclera and the retina, with the distance being determined substantially perpendicular to a direction of a lateral extent of the choroid. Herein, the lateral extent of the choroid can exceed the layer thickness of the choroid by at least a factor of 10, typically by at least a factor of 20, particularly typically by at least a factor of 50.

As further used herein, the term "capturing" or any grammatical variation thereof refers to a recording of at least one variable captured by a measurement, from which the choroidal topography, in particular the thickness of the choroidal layer, can be derived. With regard to the present disclosure, capturing the choroidal topography over the region on the retina of the eye of the person comprises using reflected light received from the region on the retina of the eye of the person. For this purpose, using an optical method may, especially, be preferred. The term "optical method" refers to a process in which light, typically light from the visible or infrared spectral range, impinges a region on the retina of the eye of the person eye, whereupon a reflection of the light from this region allows drawing conclusions about the choroidal topography, in particular the thickness of the choroidal layer. Alternatively or in addition, an acoustic method or a photoacoustic method may also be used. Herein, the terms "acoustic method" or "photoacoustic method" refer to a process during which the retina is impinged by acoustic waves, typically ultrasound waves, wherein the measuring device is configured for capturing the acoustic waves, typically the ultrasound waves, an in acoustic manner or an optical manner, respectively.

In a particularly preferred configuration, the optical method can be selected from a method for optical coherence tomography. For this purpose, the measuring device for capturing the choroidal topography over the region on the retina of the eye of the person may be or comprise an optical coherence tomographic system (OCT). As generally used, the terms "optical coherence tomography" and "OCT" refer to an imaging method for generating a two-dimensional or three-dimensional recording of biological tissue, in particular of the choroid, wherein a resolution in the micrometer range can typically be obtained. To generate the desired recording, light with a temporally short coherence length from a radiation source is split into two parts in a beam splitter, wherein a first part of the light impinges on the tissue along an optical axis, wherein a second part of the light is guided over a reference path, and wherein the light reflected by the tissue is made to interfere with the reference light guided over the reference path in order to generate an interference signal. From the interference signal generated thus, it is possible initially to only distinguish structures in the tissue, especially on the retina of the eye of the person, along the optical axis; however, the desired two- or three-dimensional recording of the tissue or a section thereof can be generated by using a scanning device configured to change the direction of the optical axis over the tissue, in other words, the eccentricity of the light crossing the pupil of the eye of the person, especially the direction of the optical axis with regard to the retina of the eye of the person. Typically, the scanning device may be configured to change the direction of the optical axis and interrogate different regions of the retina of the eye of the person.

Typically, the optical coherence tomography method can be selected from a Fourier domain OCT or a time domain OCT, with the Fourier domain OCT, in particular spectral domain OCT or swept source OCT, being particularly preferred. The term "time domain OCT" denotes a procedure in which a length of a reference path is altered and an intensity of the interference is continuously captured during the process, wherein a change in the frequency spectrum of the interference remains unconsidered. Further, the term "Fourier domain OCT" refers to a process in which an alteration in components of the frequency spectrum of the interference is taken into account. If the c alteration in the frequency spectrum of the interference is simultaneously excited and captured by means of a broadband radiation source, this process is typically referred to as "spectral domain OCT." Still further, in "swept source OCT," the components of the frequency spectrum are temporally successively excited and captured, in particular by successive tuning of the frequency excitation of the radiation source.

In an alternative embodiment, the optical method can be selected from an adaptive optical method. As generally used, the term "adaptive optical method" refers to a process configured for interrogating, manipulating and compensating optical deviations of at least one of the measuring device or the eye. By using an adaptive optical method, effects of the at least one of the measuring device, the eye, or programmed imaging properties from alterations detected in the choroidal topography can be disentangled. Typically, the adaptive optical method may involve operating in combination at least one ocular aberrometer and at least one digitally addressed light modulation element. However, using other types of adaptive optical methods and devices are also conceivable.

In an exemplary embodiment, the apparatus may, further, comprise at least one optical relay system, which may be configured for providing the at least one individual retinal stimulus to the corresponding individual digitally addressable light modulation element. As generally used, the term "optical relay system" refers to a combination of at least two optical elements, wherein the combination is designated for transferring an optical plane to a different position. By way of example, a retinal stimulus as shown on a display may, thus, be transferred to an entrance of the light modulation element, or an individual phase map provided at an exit of the light modulation element may, thus, be transferred to be displayed on the pupil of the eye of the person. Typically, the relay optical system may comprise at least one of a parabolic mirror or an optical lens; however, using at least one further optical element may also be feasible.

In a further exemplary embodiment, the first apparatus may, additionally, comprise at least one Badal stage, which may be configured for correcting a defocus error. As particularly preferred, the at least one Badal stage may be incorporated into the at least one optical relay system. As generally used, the term "Badal lens" refers to an optical element comprising at least one lens, which is configured for displaying a target under the same angular size. In this further exemplary embodiment, the Badal lens could, advantageously, be used for correcting a spherical error.

In a still further exemplary embodiment, the first apparatus may, additionally, comprise at least one ocular aberrometer, which may be configured for determining at least one value of an ocular aberration at the at least two separate regions on the retina of the eye of the person by using reflected light received from the region on the retina of the eye of the person. In particular, the at least one ocular aberrometer may, especially, be configured for determining at least one value of a refractive effect related to the at least two separate regions on the retina of the eye of the person. As generally used, the term "ocular aberration" refers to a difference between a surface of an ideal optical wavefront and a surface of an actual optical wavefront which is determined for the at least one eye of a person. Herein, the term "optical wavefront" relates to a surface which is perpendicular to a beam along which light propagates. Within a typical human population, the ocular aberration, usually, comprises at least one second-order sphero-cylindrical focus error, also denoted as "refractive effect," wherein, however, at last one higher-order aberration may also occur. As further generally used, the term "ocular aberrometer" refers to a device which is configured for determining at least one value for the difference between the surface of an ideal optical wavefront and the surface of an actual optical wavefront in a process, which is, typically denoted by the term "ocular aberrometry." For a purpose of determining the at least one value of the refractive effect, the first apparatus may, particularly, comprise an individual ocular aberrometer for each different retinal eccentricity. In an alternative embodiment, the apparatus may only comprise a single one ocular aberrometer for at least two different retinal eccentricities.

In a particular embodiment, the at least one ocular aberrometer may, typically, be or comprise at least one wavefront sensor. As generally used, the term "wavefront sensor" refers to an optical sensor, which is designated for measuring the aberrations of an optical wavefront, wherein the term is, usually, applied to an optical sensor which does not require interference with a reference beam having no aberrations. Herein, the wavefront sensor may, typically be selected from at least one of: a Hartmann-Shack wavefront sensor (HSWS), a camera designated for measuring at least one point-spread function of an eccentric wavefront, a circular lenslet array aberrometer, a pyramid wavefront sensor, a phase element based wavefront sensor, a ray tracing aberrometer. However, further kinds of wavefront sensors may also be feasible. As generally used, the terms "Hartmann-Shack wavefront sensor" and "HSWS" refer to a particular type of wavefront sensor which comprises an array of individual small lenses which are, usually, denoted by the term "lenslets" and a two-dimensional optical detector, such as a CCD array, a CMOS array, or a quad-cell, wherein, upon uniform illumination of the lenslets, an integrated gradient of the incident optical wavefront across each lenslet is proportional to a displacement produced by each individual lenslet. In other words, an aberration of a phase of the incident optical wavefront can, thus, be approximated by a set of local tilts corresponding to the individual lenslets, wherein the tilts corresponding to the lenslets can also denoted by the term "eccentricities." By sampling the incident optical wavefront by virtue of the array of the lenslets in this fashion, the incident optical wavefront can, thus, at least partially, typically completely, be reconstructed by measuring the local eccentricity of each individual lenslet within the array of the lenslets.

In a further exemplary embodiment, the apparatus may, additionally, comprise at least one light source, which may be configured for generating at least one light beam that is used in determining the at least one value of the ocular aberration. As generally used, the term "light source" refers to a device, which is designated for generating at least one light beam, wherein the at least one light beam that is provided by the light source is guided along at least one optical path. Herein, the at least one light source may, typically, generate light having a that is longer than a wavelength used for the measuring device, especially for the optical coherence tomographic system, and may, thus, be or comprise an IR light source, in particular an IR light-emitting diode. As indicated above, IR light refers to electromagnetic radiation having a wavelength above 780 nm to about 1000 μm, wherein near IR light having a wavelength above 780 nm to about 1.5 μm may, especially, be preferred. In particular, the least one ocular aberrometer may be configured for determining the at least one value of the ocular aberration at the at least two separate regions on the retina of the eye of the person, especially by using a portion of the reflected light as received from the region on the retina of the eye of the person that has been generated by using the at least one light source.

In a still further exemplary embodiment, the apparatus may, additionally, comprise at least two polarizers, which may be configured for rejecting specular reflections on a cornea of the eye of the person. The at least two polarizers can be placed adjacently in a beam path, wherein each of which is configured for allowing a portion of wavefront having a particular polarization to pass, while blocking a further portion of a wavefront having of different polarization. In particular, the at least two polarizers may be placed in front of at least one of the ocular aberrometer, in particular the Hartmann-Shack wavefront sensor (HSWS), and the light source, in typically the IR light source, in particular the IR light-emitting diode. In this manner, a processing of the ocular aberrometer, in particular the Hartmann-Shack wavefront sensor (HSWS), could be improved by rejecting specular reflections on the cornea.

In a still further exemplary embodiment, the apparatus may, additionally, comprise at least one camera, which may be configured for determining an alignment of the eye of the person. As generally used, the term "camera" refers to a device which is configured for generating at least one image of an object. As used herein, the term "alignment" refers to a relative orientation of both eyes of the person. For a purpose of ensuring high-quality measurements, especially, the pupils of both eyes of the person may be monitored by using at least one camera, typically two cameras, and IR light-emitting diodes, which are non-visible to the eyes of the person, during both projecting the phase map to the region on the retina of the eye of the person and capturing the choroidal topography over the region on the retina of the eye of the person.

As already indicated above, the apparatus further comprises an optical filter, which is configured for separating the reflected light received from the region on the retina of the eye of the person from the phase map projected to the region on the retina of the eye of the person. As generally used, the term "optical filter" refers to an optical element, which is configured for selectively passing at least one portion of incident light in at least one direction. Typically, the optical filter may be selected from at least one of a dichroic mirror, a spectral filter, or a beam splitter; however, using a different type of optical filter may also be feasible. As generally used, the term "dichroic mirror" is configured for selectively passing incident light having a small wavelength range and reflecting the incident light outside the small wavelength range.

In a particularly exemplary embodiment, the apparatus may, further, comprise a processing device, which may, especially, be configured for both controlling at least one element, typically the modules, of the apparatus and determining an effect of at least one ophthalmic lens design on the choroidal topography. As generally used, the term "processing" or any grammatical variation thereof refers to applying at least one algorithm to input data to determine output data. As further generally used, the term "determining" or any grammatical variation thereof refers to a process of interpreting input data, specifically for obtaining at least one representative result. According to the present disclosure, the input data comprising values of the choroidal topography may be used for a purpose of determining the effect of the at least one ophthalmic lens design on the choroidal topography. Further uses of the processing device may be feasible.

In a further aspect, the present disclosure relates to a method configured for determining a choroidal topography over a region on a retina of an eye of a person. The method comprises the following steps a) to c):

a) projecting a phase map to a region on a retina of an eye of a person by using at least one optical transfer element, wherein the phase map comprises a modified retinal stimulus;

b) separating reflected light received from the region on the retina of the eye of the person from the phase map projected to the region on the retina of the eye of the person by using an optical filter; and c) capturing a choroidal topography over the region on the retina of the eye of the person by determining the reflected light received from the region on the retina of the eye of the person by using a measuring device; and providing at least two independent retinal stimuli by using at least two individual displays, respectively, and simultaneously projecting each of at least two individual phase maps at a different retinal eccentricity to each of at least two separate regions on the retina of the eye of the person, wherein the at least two separate regions comprise a peripheral region and a foveal region on the retina of the eye of the person.

Herein, the indicated steps may, typically, be performed in the given order, commencing with step a), continuing with step b), and finishing with step c). However, any or all of the indicated steps may also be performed concurrently in part and/or repeated several times. Further, the steps of this method can, as particularly preferred, be performed by using the apparatus as described elsewhere herein.

In accordance with step a), at least two individual phase maps are projected to at least two separate regions on the retina of the eye of the person, wherein at least one of the two separate regions is a peripheral region on the retina of the eye of the person beyond a fovea on the retina of the eye of the person. For this purpose, at least one optical transfer element as described above or below in more detail may, typically, be used. In a particularly exemplary embodiment, each individual phase map may be simultaneously projected to more than one of the at least two separate regions on the retina of the eye of the person.

In accordance with step b), reflected light received from the region on the retina of the eye of the person is separated from the phase map projected to the region on the retina of the eye of the person.

In accordance with step c), a choroidal topography is captured over the region on the retina of the eye of the person. For this purpose, the reflected light which is received from the region on the retina of the eye of the person may, typically, be used by a measuring device as described above or below in more detail.

In an exemplary embodiment, the method may further comprise a step of at least one of:

d) generating at least one of the individual phase maps by modifying at least one imaging property of a retinal stimulus by using a digitally addressable light modulation element;

e) determining at least one value of an ocular aberration at the at least two separate regions on the retina of the eye of the person by using reflected light received from the region on the retina of the eye of the person by using at least one ocular aberrometer;

f) generating at least one light beam used in determining the at least one value of the ocular aberration by using at least one light source;

g) determining an alignment of the eye of the person by using at least one camera.

For further details concerning the method for projecting a retinal stimulus to a region on a retina of an eye of a person and for determining a choroidal topography over the region on the retina of the eye of the person, reference can be made to the description of the apparatus for projecting a retinal stimulus to a region on a retina of an eye of a person and for determining a choroidal topography over the region on the retina of the eye of the person as provided elsewhere herein.

In a further aspect, the present disclosure relates to a use of the apparatus as described above or below in more detail for determining an effect of at least one ophthalmic lens design on a choroidal topography. As generally used, the term "ophthalmic lens design" refers to a procedure which is designed for generating a set of parameters which are used for producing at least one spectacle lens for the person in a manufacturing process.

Consequently, the apparatus and the corresponding method can, in particular, be used for determining short-term temporal changes in the choroidal topography due to at least one ophthalmic lens design. Further, the apparatus and the corresponding method can, advantageously, be used for reproducing the performance of the ophthalmic lens design for foveal and peripheral vision as well as for determining the choroidal topography over a short period of retinal stimulation, typically in a range of minutes. Thereby, the short-term results as obtained in this manner can be used for anticipating long-term effects, thereby, allowing an optimization of ophthalmic lens design prior to performing clinical studies.

As used herein, the terms "have," "comprise" or "include" or any arbitrary grammatical variation thereof are used in a non-exclusive way. Thus, these terms may refer to both a situation in which, besides the feature introduced by these terms, no further features are present in the entity described in this context and to a situation in which one or more further features are present. As an example, the expressions "A has B," "A comprises B" and "A includes B" may both refer to a situation in which, besides B, no other element is present in A (i.e., a situation in which A solely and exclusively consists of B) and to a situation in which, besides B, one or more further elements are present in entity A, such as element C, elements C and D or even further elements.

As further used herein, the terms "typically," "more typically," "particularly," "more particularly," or similar terms are used in conjunction with optional features, without restricting alternative possibilities. Thus, features introduced by these terms are optional features and are not intended to restrict the scope of the claims in any way. The disclosure may, as the skilled person will recognize, be performed by using alternative features. Similarly, features introduced by "in an embodiment of the disclosure" or similar expressions are intended to be optional features, without any restriction regarding alternative embodiments of the disclosure, without any restrictions regarding the scope of the disclosure and without any restriction regarding the possibility of combining the features introduced in this way with other features of the disclosure.

Summarizing, the following Clauses are particularly typical within the scope of the present disclosure:

Clause 1: An apparatus for projecting a retinal stimulus to a region on a retina of an eye of a person and for determining a choroidal topography over the region on the retina of the eye of the person, comprising:

at least one optical transfer element configured for projecting a phase map to a region on a retina of an eye of a person, wherein the phase map comprises a modified retinal stimulus;

a measuring device for capturing a choroidal topography over the region on the retina of the eye of the person by using reflected light received from the region on the retina of the eye of the person;

an optical filter configured for separating the reflected light received from the region on the retina of the eye of the person from the phase map projected to the region on the retina of the eye of the person, wherein the apparatus is configured for generating at least two individual phase maps, wherein the at least one optical transfer element is configured for projecting each individual phase map to one of at least two separate regions on the retina of the eye of the person, wherein at least one of the two separate regions is a peripheral region on the retina of the eye of the person beyond a fovea on the retina of the eye of the person.

Clause 2: The apparatus according to the preceding clause, wherein the at least one optical transfer element is configured for simultaneously projecting each individual phase map to more than one of the at least two separate regions on the retina of the eye of the person.

Clause 3: The apparatus according to any one of the preceding clauses, wherein the at least one optical transfer element is configured for projecting each individual phase map at a different retinal eccentricity to each separate region on the retina of the eye of the person.

Clause 4: The apparatus according to the preceding clause, wherein the at least one optical transfer element is configured for projecting at least one of the at least two individual phase maps at a fixed retinal eccentricity.

Clause 5: The apparatus according to any one of the two preceding clauses, wherein the at least one optical transfer element is configured for projecting at least one of the at least two individual phase maps at a variable eccentricity.

Clause 6: The apparatus according to the preceding clause, wherein the at least one optical transfer element is or comprises at least one of a mirror, a beam splitter, a rotational beam splitter, or a diffractive element configured for projecting at least one light beam at a particular eccentricity on the retina of the eye of the person.

Clause 7: The apparatus according to any one of the preceding clauses, wherein the optical filter is selected from at least one of a dichroic mirror, a spectral filter, a beam splitter, or a rotational beam splitter.

Clause 8: The apparatus according to any one of the preceding clauses, further comprising
at least one digitally addressable light modulation element configured for generating the at least two individual phase maps by modifying at least one imaging property of the at least two retinal stimuli.

Clause 9: The apparatus according to the preceding clause, wherein the digitally addressable light modulation element is or comprises at least one spatial light modulator (SLM) or digital micro-mirror device (DMD).

Clause 10: The apparatus according to any one of the two preceding clauses, further comprising:
a single digitally addressable light modulation element configured for generating at least two of the individual phase maps,
a first telescope configured for providing at least two individual retinal stimuli to the single digitally addressable light modulation element; and
a second telescope configured for separating the at least two individual phase maps to be projected to one of at least two separate regions on the retina of the eye of the person.

Clause 11: The apparatus according to the preceding clause, wherein each of the first telescope and the second telescope comprises at least two mirrors and at least one prism.

Clause 12: The apparatus according to any one of the preceding clauses, further comprising:
at least two individual displays each configured for providing at least one individual retinal stimulus.

Clause 13: The apparatus according to the preceding clause, further comprising:
an individual digitally addressable light modulation element configured for generating one of the at least two individual phase maps.

Clause 14: The apparatus according to the two preceding clauses, wherein an individual display is configured for providing the at least one individual retinal stimulus to the corresponding individual digitally addressable light modulation element.

Clause 15: The apparatus according to the preceding clause, further comprising:
at least one first optical relay system configured for providing the at least one individual retinal stimulus to the corresponding individual digitally addressable light modulation element.

Clause 16: The apparatus according to the preceding clause, further comprising:
at least one Badal stage configured for correcting a defocus error.

Clause 17: The apparatus according to the preceding clause, wherein the at least one Badal stage is incorporated into the at least one optical relay system.

Clause 18: The apparatus according to any one of the preceding clauses, further comprising:
at least one refractive correction element, in particular the at least one non-pixelated correcting element, configured for generating one of the at least two individual phase maps.

Clause 19: The apparatus according to any one of the preceding clauses, further comprising:
at least one ocular aberrometer configured for determining at least one value of an ocular aberration at the at least two separate regions on the retina of the eye of the person by using reflected light received from the at least two separate regions on the retina of the eye of the person.

Clause 20: The apparatus according to the preceding clause, wherein the at least one ocular aberrometer is configured for determining at least one value of a refractive effect related to the at least two separate regions on the retina of the eye of the person.

Clause 21: The apparatus according to any one of the two preceding clauses, wherein the apparatus comprises an individual ocular aberrometer for each different retinal eccentricity.

Clause 22: The apparatus according to any one of the three preceding clauses, wherein the apparatus comprises a single ocular aberrometer for at least two different retinal eccentricities.

Clause 23: The apparatus according to any one of the four preceding clauses, wherein the at least one ocular aberrometer is or comprises at least one wavefront sensor, in particular at least one Hartmann-Shack wavefront sensor (HSWS).

Clause 24: The apparatus according to any one of the five preceding clauses, further comprising:

- at least one light source configured for generating at least one light beam used in determining the at least one value of the ocular aberration.

Clause 25: The apparatus according to the preceding clause, wherein the least one ocular aberrometer is configured for determining the at least one value of the ocular aberration at the at least two separate regions on the retina of the eye of the person by using a portion of the reflected light received from the at least two separate regions on the retina of the eye of the person generated by the at least one light source.

Clause 26: The apparatus according to any one of the two preceding clauses, wherein at least one light source is or comprises an IR light source, in particular an IR light-emitting diode.

Clause 27: The apparatus according to any one of the preceding clauses, further comprising:

- at least two polarizers configured for rejecting specular reflections on a cornea of the eye of the person.

Clause 28: The apparatus according to the preceding clause, wherein the at least two polarizers are placed in front of at least one of the ocular aberrometer, in particular the Hartmann-Shack wavefront sensor (HSWS), and the light source, in typically the IR light source, in particular the IR light-emitting diode.

Clause 29: The apparatus according to any one of the preceding clauses, wherein the measuring device for capturing the choroidal topography over the at least two separate regions on the retina of the eye of the person is or comprises an optical coherence tomographic system (OCT).

Clause 30: The apparatus according to the preceding clause, wherein the optical coherence tomographic system (OCT) is configured for performing at least one of Fourier domain OCT, swept source OCT, or time domain OCT.

Clause 31: The apparatus according to any one of the preceding clauses, further comprising

- at least one camera configured for determining an alignment of the eye of the person.

Clause 32: The apparatus according to any one of the preceding clauses, further comprising

- a processing device configured for controlling at least one element of the apparatus and for determining an effect of at least one ophthalmic lens design on the choroidal topography.

Clause 33: A use of the apparatus according to any of the preceding clauses for determining an effect of at least one ophthalmic lens design on a choroidal topography.

Clause 34: A method for projecting a retinal stimulus to a region on a retina of an eye of a person and for determining a choroidal topography over the region on the retina of the eye of the person, the method comprising the following steps:

a) projecting a phase map to a region on a retina of an eye of a person by using at least one optical transfer element, wherein the phase map comprises a modified retinal stimulus;

b) separating reflected light received from the region on the retina of the eye of the person from the phase map projected to the region on the retina of the eye of the person by using an optical filter; and c) capturing a choroidal topography over the region on the retina of the eye of the person by using the reflected light received from the region on the retina of the eye of the person by using a measuring device, wherein at least two individual phase maps are generated, wherein each individual phase map is projected to one of at least two separate regions on the retina of the eye of the person by using the at least one optical transfer element, wherein at least one of the two separate regions is a peripheral region on the retina of the eye of the person beyond a fovea on the retina of the eye of the person.

Clause 35: The method according to the preceding clause, wherein each individual phase map is simultaneously projected to more than one of the at least two separate regions on the retina of the eye of the person.

Clause 36: The method according to any one of the preceding method clauses, further comprising a step of:

d) generating at least one of the individual phase maps by modifying at least one imaging property of the retinal stimulus by using a digitally addressable light modulation element.

Clause 37: The method according to any one of the preceding method clauses, further comprising a step of:

e) providing at least one two individual retinal stimuli by using at least two displays for generating the at least two individual phase maps.

Clause 38: The method according to any one of the preceding method clauses, further comprising a step of:

f) determining at least one value of an ocular aberration at the at least two separate regions on the retina of the eye of the person by using reflected light received from the at least two separate regions on the retina of the eye of the person by using at least one ocular aberrometer.

Clause 39: The method according to the preceding method clause, further comprising a step of:

g) generating at least one light beam used in determining the at least one value of the ocular aberration by using at least one light source.

Clause 40: The method according to any one of the preceding method clauses, further comprising a step of:

h) determining an alignment of the eye of the person by using at least one camera.

BRIEF DESCRIPTION OF THE DRAWINGS

Further optional features and embodiments of the present disclosure are disclosed in more detail in the subsequent description of exemplary embodiments, typically in conjunction with the dependent claims. Therein, the respective optional features may be implemented in an isolated fashion as well as in any arbitrary feasible combination, as the skilled person will recognize. It is emphasized here that the scope of the disclosure is not restricted by the exemplary embodiments as disclosed herein. In the drawings:

DESCRIPTION OF EXEMPLARY EMBODIMENTS

Figure 1:
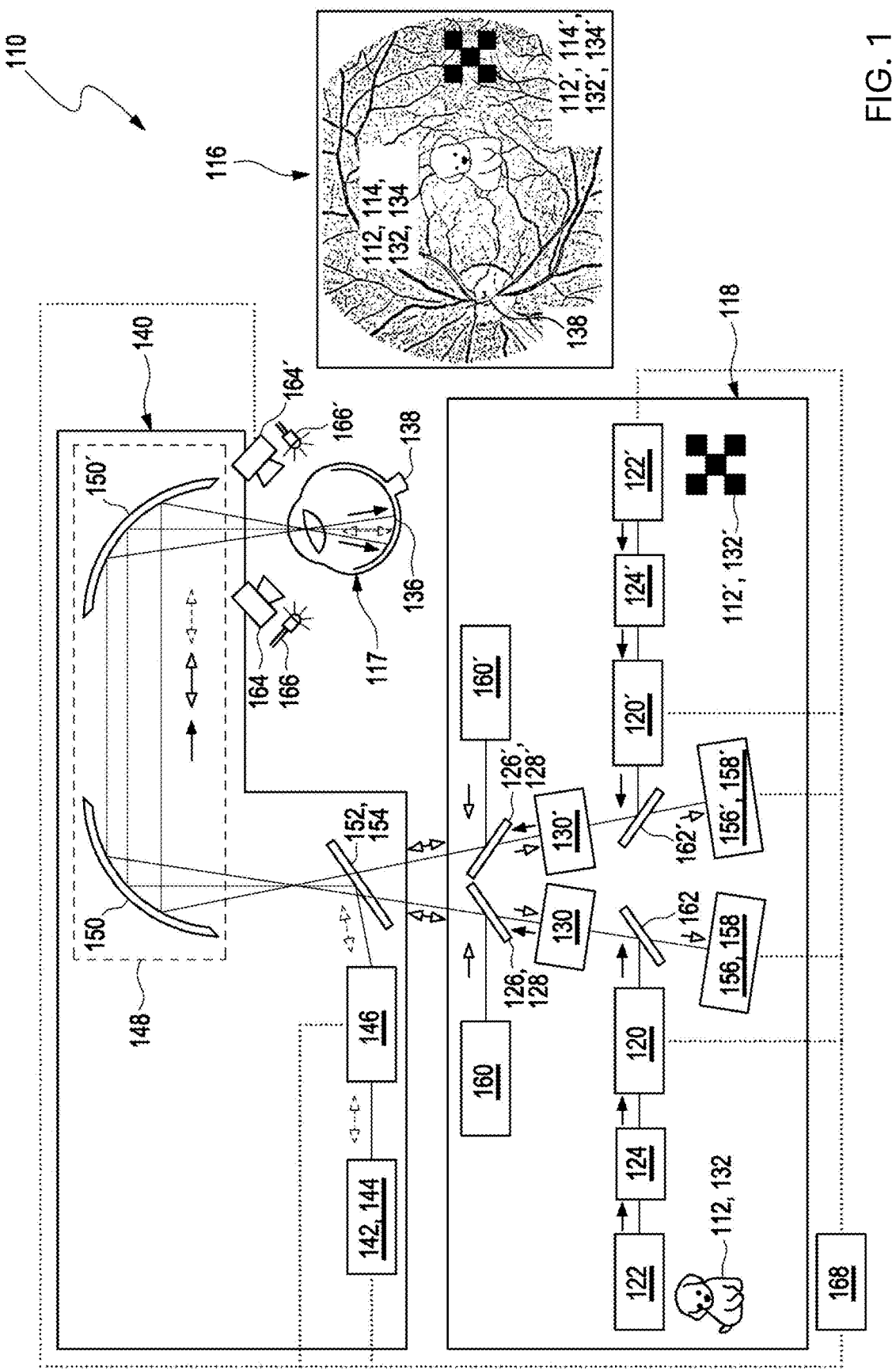
FIG. 1 illustrates an exemplary embodiment of an apparatus according to the present disclosure.

FIG. 1 illustrates an embodiment of an apparatus 110 according to the present disclosure, which is configured for projecting retinal stimuli 112, 112' to regions 114, 114' on a retina 116 of an eye 117 of a person and/or for determining a choroidal topography at least over the regions 114, 114' on the retina 116 of the eye 117 of the person. As described elsewhere herein in more detail, the apparatus 110 can, particularly, be used for determining an effect of an ophthalmic lens design on the choroidal topography, especially, over a short period of retinal stimulation, typically in a range of minutes, in a manner that the short-term results can be used for anticipating long-term effects, thereby, allowing an optimization of ophthalmic lens design prior to performing clinical studies.

As schematically depicted in FIG. 1, the apparatus 110 has a first module 118, which comprises digitally addressable light modulation elements 120, 120', each of which is configured for generating an individual phase map. For this purpose, two independent and different retinal stimuli 112, 112' are, typically simultaneously, emitted by two individual displays 122, 122' and transferred to an entrance of the digitally addressable light modulation element 120, 120' by using correspondingly adapted first optical relay systems 124, 124'. As described above in more detail, the digitally addressable light modulation elements 120, 120' are designed for modulating the incident retinal stimuli 112, 112' as provided by the respective displays 122, 122' and may, typically, be selected from a spatial light modulator (SLM) or a digital micro-mirror device (DMD); however, using a different type of digitally addressable light modulation element may also be feasible.

As further schematically depicted in FIG. 1, the first module 118 of the apparatus, further, comprises two first optical transfer elements 126, 126', each of which is configured for projecting an individual phase map to the regions 114, 114' on the retina 116 of the eye 117 of the person, respectively. For this purpose, each individual phase map that is provided at an exit of each digitally addressable light modulation element 120, 120' is transferred to the first optical transfer elements 126, 126', each of which is embodied here as a beam splitter 128, 128', by using correspondingly adapted second optical relay systems 130, 130'.

Each of the first optical transfer elements 126, 126' is configured for projecting the corresponding individual phase map to the respective regions 114, 114' on the retina 116 of the eye 117 of the person. Further, as second optical transfer elements configured for simultaneously projecting each of at least two individual phase maps at a different retinal eccentricity to each of at least two separate regions 114, 114' on the retina, i.e., a foveal region and a peripheral region, cold mirrors 162, 162' are used. As further illustrated in FIG. 1, a central retinal stimulus 132, which is schematically depicted here as a little dog, is projected to a first separate region 134, wherein the first separate region 134 comprises the fovea 136, which is located on the retina 116 of the eye 117 of the person. In addition, a peripheral retinal stimulus 132', which is schematically depicted here as a checkered pattern, is projected to a second separate region 134', wherein the second separate region 134' is located outside the fovea 136 on the retina 116 of the eye 117 of the person. Typically, the second separate region 134' is, further, located outside a region which comprises an optic nerve 138 of the eye 118 of the person.

As further schematically depicted in FIG. 1, the apparatus 110 has a second module 140, which comprises a measuring device 142, which is configured for capturing a choroidal topography, especially a thickness of the choroidal layer, over the regions 114, 114' on the retina 116 of the eye 117 of the person by using reflected light received from the regions 114, 114' on the retina 116 of the eye 117 of the person. As depicted there, the measuring device 142 comprises an optical coherence tomographic system (OCT) 144, which is supplemented here by a scanning device 146 configured to change a direction of the optical axis and interrogate different regions of the retina 116 of the eye 117 of the person; however, using a different type of measuring device may also be feasible. For a purpose of guiding both incident light comprising the individual phase maps to the respective regions 114, 114' on the retina 116 of the eye 117 of the person and reflected light received from the regions 114, 114' on the retina 116 of the eye 117 of the person, the second module 140, further, comprises a telescope 148 comprising two parabolic mirrors 150, 150' as further shown in FIG. 1. However, replacing at least one of the parabolic mirrors 150, 150' by an achromatic lens may also be feasible.

As further schematically depicted in FIG. 1, the second module 140 further comprises an optical filter 152, which is configured for separating the reflected light received from the regions 114, 114' on the retina 116 of the eye 117 of the person from each individual phase map to be projected to the corresponding region 114, 114' on the retina 116 of the eye 117 of the person. As depicted in FIG. 1, a dichroic mirror 154 is used for this purpose; however, using a different type of optical filter may also be feasible. In this manner, the apparatus 110 is configured for both projecting the retinal stimuli 112, 112' to the separate regions 114, 114' on the retina 116 of the eye 117 of a person and for determining the choroidal topography over the separate regions 114, 114' on the retina 116 of the eye 117 of the person.

In addition, the apparatus 110 as shown in FIG. 1 is, further, equipped with ocular aberrometers 156, 156', which are configured for determining values of an ocular aberration at the separate regions 114, 114' on the retina 116 of the eye 117 of the person by using reflected light received from the regions 114, 114' on the retina 116 of the eye 117 of the person. For this purpose, each ocular aberrometer 156, 156' comprises a wavefront sensor, in particular a Hartmann-Shack wavefront sensor (HSWS) 158, 158'; however, using a different type of ocular aberrometer may be conceivable. For a purpose of generating light beams that are used in determining the values of the ocular aberrometry, light sources 160, 160' are provided. As depicted in FIG. 1, each light source 160, 160' comprises an IR light source, in particular an IR light-emitting diode; however, using a different type of light sources may also be feasible. For guiding the IR light emitted from the light sources 160, 160' into the regions 114, 114' on the retina 116 of the eye 117 of the person, cold mirrors 162, 162' are used. For guiding the reflected IR light from the regions 114, 114' on the retina 116 of the eye 117 of the person, the optical filter 152, the optical transfer elements 126, 126', and the cold mirrors 162, 162' are used here. However, using a different arrangement may also be feasible.

In addition, the apparatus 110 as shown in FIG. 1 is, still further, equipped with cameras 164, 164', which are configured for determining an alignment of each eye 117 of the person. In this manner, high-quality measurements can be ensured, especially, by monitoring a pupil of each eyes 117 of the person. As further depicted there, IR light-emitting diodes 166, 166', which are non-visible to the eyes 117 of the person, are employed during both projecting the phase map to the regions 114, 114' on the retina 116 of the eye 117 of the person and capturing the choroidal topography over the regions 114, 114' on the retina 116 of the eye 117 of the person.

As further schematically depicted in FIG. 1, the apparatus 110 has a processing device 168, which is configured here for both controlling the modules 118, 140 of the apparatus and determining an effect of at least one ophthalmic lens design on the choroidal topography. For the latter purpose, input data comprising values of the choroidal topography may be used for determining the effect of the at least one ophthalmic lens design on the choroidal topography. In addition, the processing device 168 may be used for further purposes.

Figure 2:
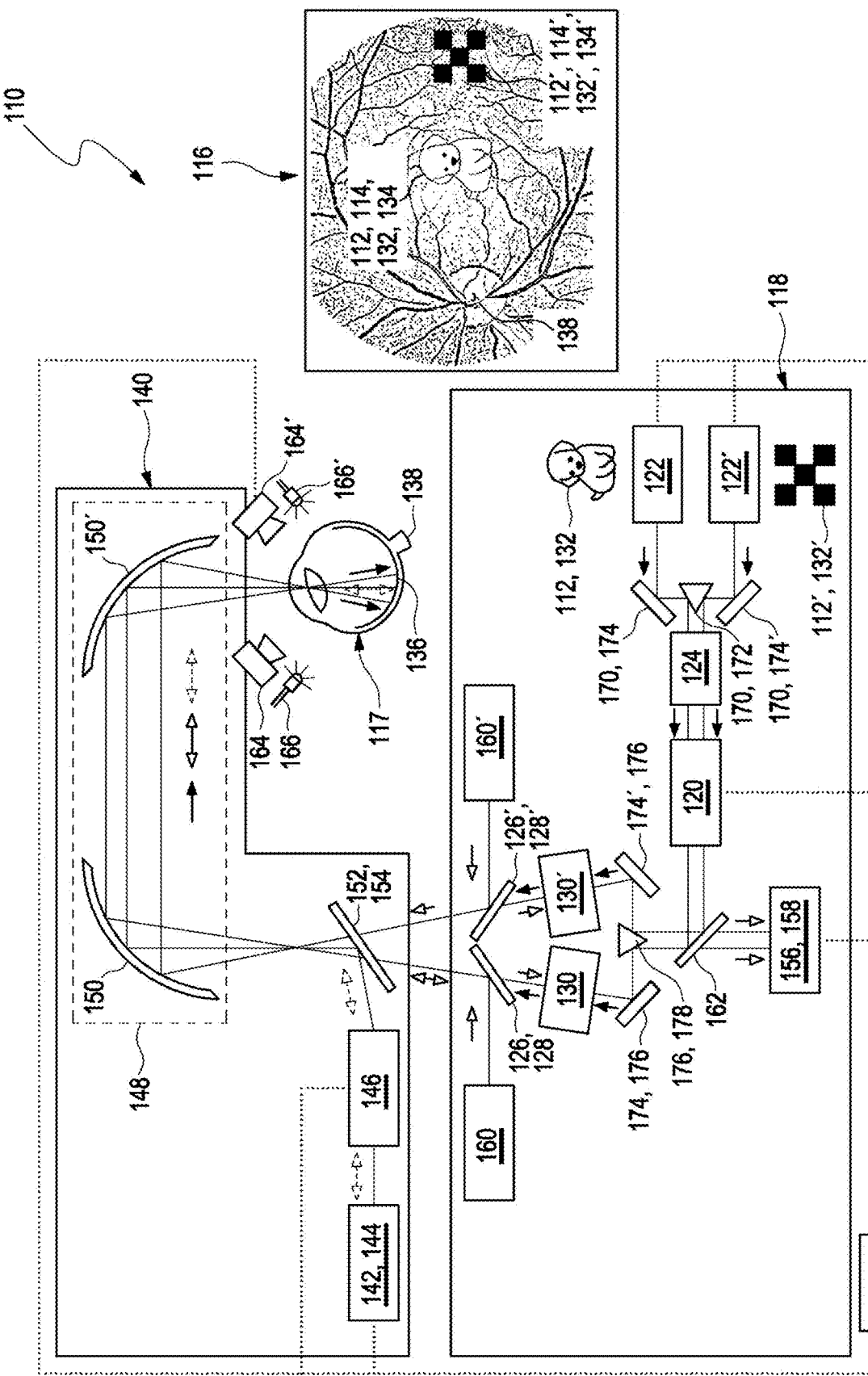
FIG. 2 illustrates another exemplary embodiment of an apparatus according to the present disclosure.

FIG. 2 illustrates a further exemplary embodiment of the apparatus 110 according to the present disclosure configured for projecting the retinal stimuli 112, 112' to the regions 114, 114' on the retina 116 of the eye 117 of the person and/or for determining the choroidal topography at least over the regions 114, 114' on the retina 116 of the eye 117 of the person. In contrast to the embodiment as depicted in FIG. 1, the embodiment of FIG. 2 only uses a single digitally addressable light modulation element 120. A third optical transfer element 170 comprising a first single prism 172 and two mirrors 174, 174' is configured for guiding the light emitted by the respective displays 122, 122' to be modulated in a corresponding half of the single digitally addressable light modulation element 120. Further, a second optical transfer element 176 comprising a single second prism 178 and the two mirrors 174, 174' is configured for simultaneously projecting each of at least two individual phase maps at different retinal eccentricity to each of the at least two separate regions 134, 134' on the retina 116 of the eye 117 of the person under a particular retinal eccentricity. Further, the reflected light from the retina 116 is used here for determining both the choroidal topography by using the measuring device 142 comprising an optical coherence tomographic system (OCT) 144 and the ocular aberration at the separate regions 114, 114' on the retina 116 by using the single ocular aberrometer 156 comprising the single Hartmann-Shack wavefront sensor (HSWS) 158 as a wavefront sensor.

Figure 3:
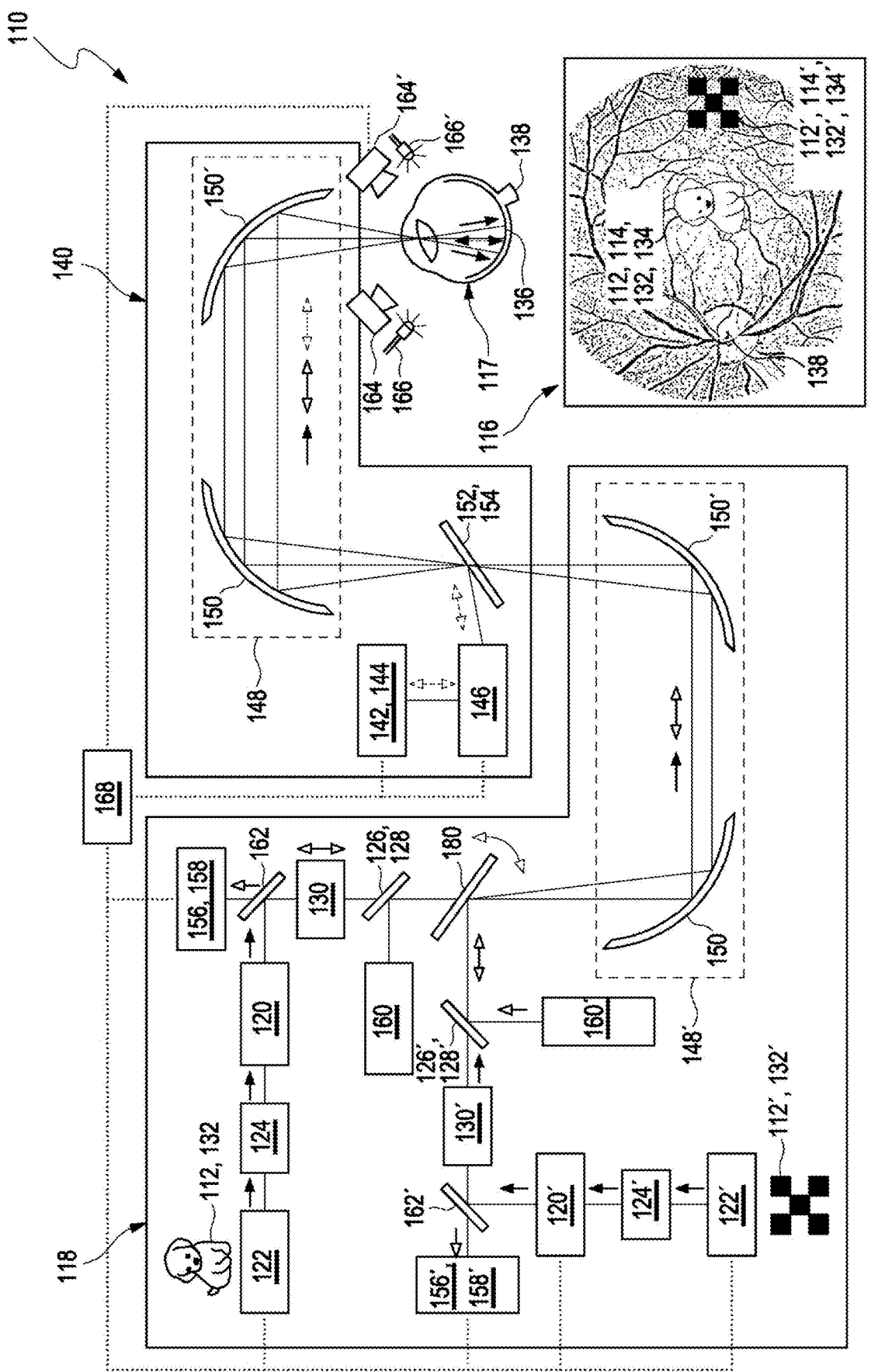
FIG. 3 illustrates yet another exemplary embodiment of an apparatus according to the present disclosure.

FIG. 3 illustrates a further exemplary embodiment of the apparatus 110 according to the present disclosure configured for projecting the retinal stimuli 112, 112' to the regions 114, 114' on the retina 116 of the eye 117 of the person and/or for determining the choroidal topography at least over the regions 114, 114' on the retina 116 of the eye 117 of the person. In contrast to the embodiment as depicted in FIG. 1, the embodiment of FIG. 3 uses a rotational beam splitter (RBS) 180, which is configured for projecting each of the individual phase maps at a different retinal eccentricity to each separate region 114, 114' on the retina 116 of the eye 117 of the person, as the second optical transfer element. In this manner, this embodiment provides a configuration having a variable eccentricity across the horizontal meridian of the peripheral retinal stimulus 132'. Herein, the light beams that are used in determining the values of the ocular aberrometry rotate together with the light beams carrying the peripheral retinal stimulus 132'. Further, the light beams are guided here to the eye 117 of the person by using two individual telescopes 148, 148', each having the parabolic mirrors 150, 150', and the dichroic mirror 154 placed between the telescopes 148, 148'.

For further details concerning the exemplary embodiments of FIG. 2 or 3, reference can be made to the description of the exemplary embodiment of FIG. 1.

Figure 4:
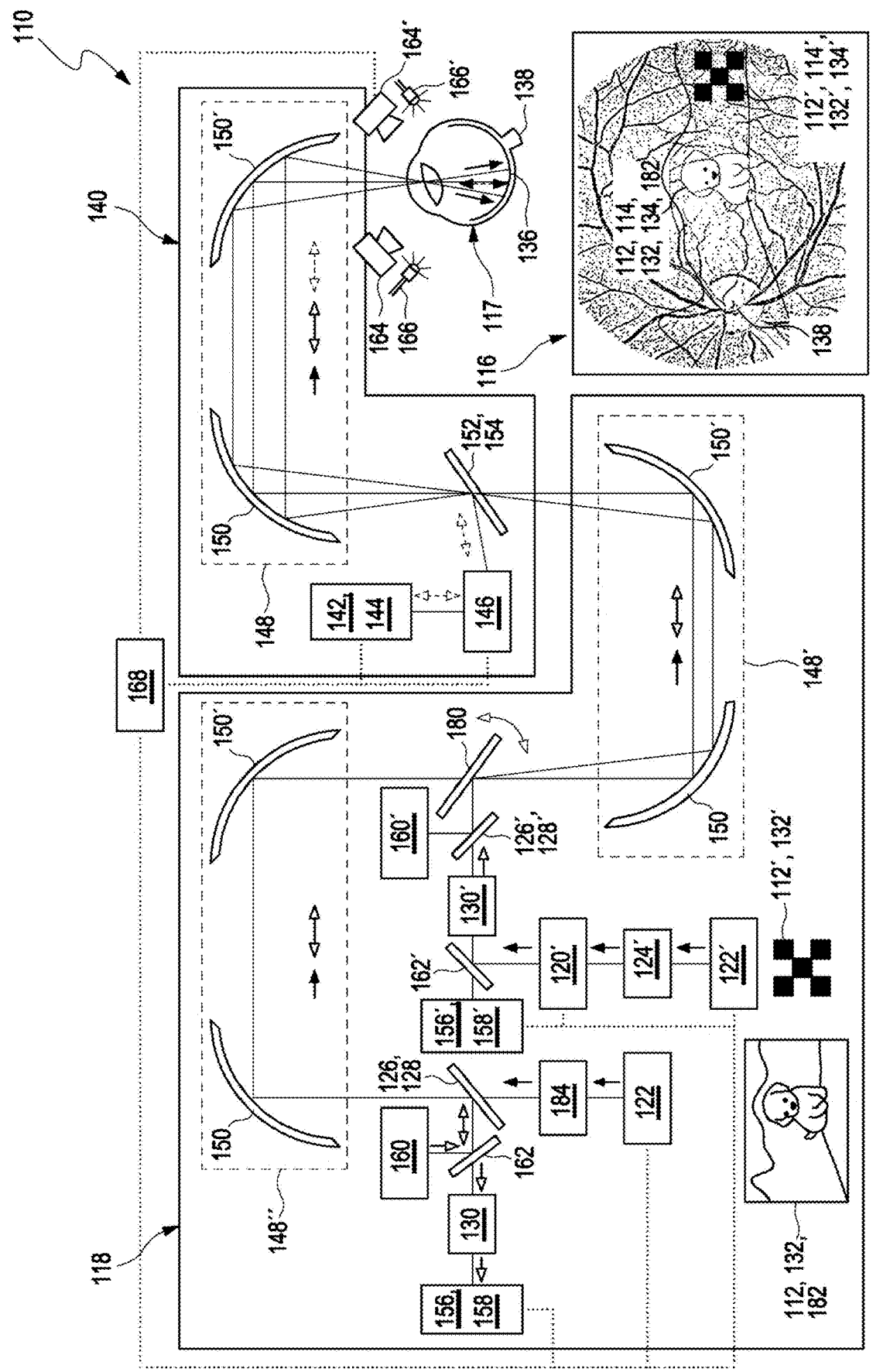
FIG. 4 illustrates yet another exemplary embodiment of an apparatus according to the present disclosure.

FIG. 4 illustrates a further exemplary embodiment of the apparatus 110 according to the present disclosure configured for projecting the retinal stimuli 112, 112' to the regions 114, 114' on the retina 116 of the eye 117 of the person and/or for determining the choroidal topography at least over the regions 114, 114' on the retina 116 of the eye 117 of the person. Again, the embodiment of FIG. 4 uses the rotational beam splitter (RBS) 180 as the second optical transfer element, which is configured for projecting each of individual phase maps at a different retinal eccentricity to each separate region 114, 114' on the retina 116 of the eye 117 of the person. In contrast to the embodiment as depicted in FIG. 3, the embodiment of FIG. 4 is configured for projecting a wide field-of-view (FOV) stimulus 182 as the central retinal stimulus 132, which is used here for offering a more natural viewing experience to the person. For this purpose, a refractive correction element, in particular the at least one non-pixelated correcting element 184, i.e., an element having a capacity to change the phase map of a light beam, wherein a surface of this element is not divided in pixels, particularly selected from a deformable mirror, a single optical lens, or a set of optical lenses, which is configured for generating the corresponding individual phase map may be used instead of a spatial light modulator (SLM) or a digital micro-mirror device (DMD), thus avoiding that the wide field-of-view may otherwise be limited. In addition, the stimulus is darkened at the region 114 of the peripheral retinal stimulus 132', whose eccentricity can vary by using the rotational beam splitter 180. Further, the two parabolic mirrors 150, 150' as compromised by a further telescope 148" and the rotational beam splitter 180 are used for merging the beams of each retinal stimulus 112, 112'.

For further details concerning the exemplary embodiments of FIG. 4, reference can be made to the description of the embodiment of FIG. 3.

Figure 5:
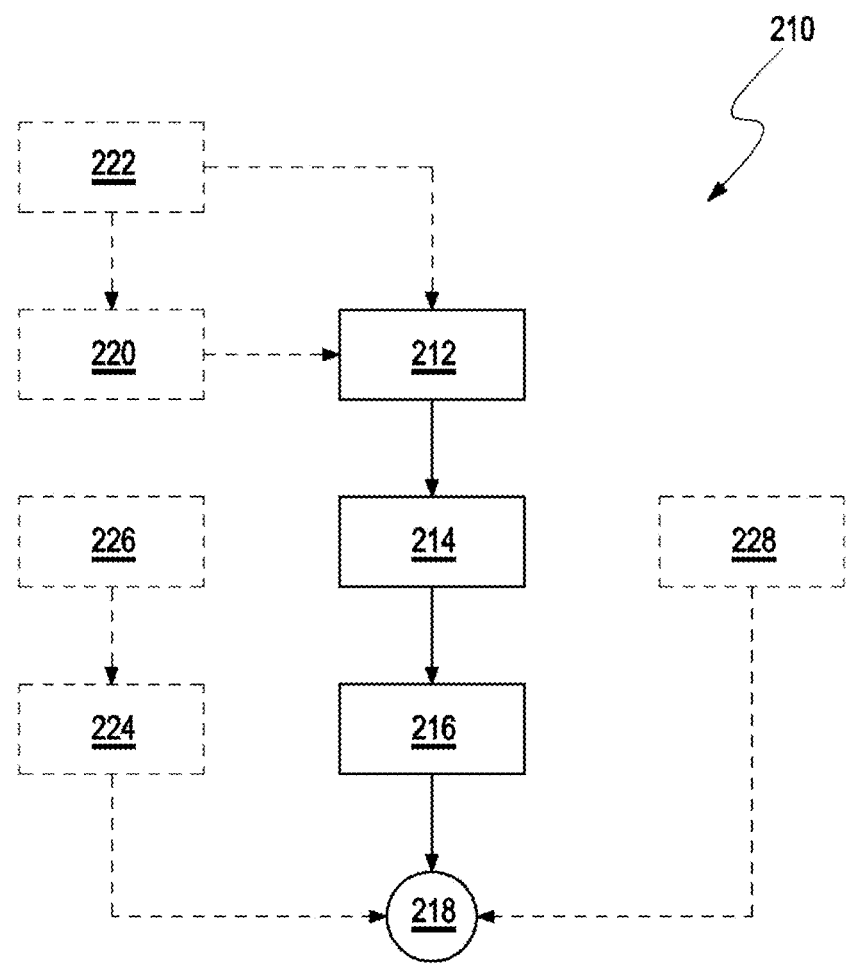
FIG. 5 illustrates an exemplary embodiment of a method according to the present disclosure.

FIG. 5 illustrates an embodiment of a method 210 according to the present disclosure for projecting the retinal stimuli 112, 112' to the regions 114, 114' on the retina 116 of the eye 117 of the person and/or for determining a choroidal topography 218 at least over the regions 114, 114' on the retina 116 of the eye 117 of the person.

In a projecting step 212 according to step b), the phase map is projected to the regions 114, 114' on the retina 116 of the eye 117 of the person by using the optical transfer elements 126, 126' as described above in more detail. Herein, each individual phase map is projected to one of the separate regions 114, 114' on the retina 116 of the eye 117, wherein one region 114' is a peripheral region on the retina 116 of the eye 117 of the person beyond the fovea 136. Typically, the individual phase maps are, simultaneously, projected to the at least separate regions 114, 114' on the retina 116 of the eye 117 of the person.

In a separating step 214 according to step b), the reflected light as received from the regions 114, 114' on the retina 116 of the eye 117 of the person is separated from the phase maps projected to the regions 114, 114' on the retina 116 of the eye 117 of the person.

In a capturing step 216 according to step c), a choroidal topography 218 is captured at least over the regions 114, 114' on the retina 116 of the eye 117 of the person by using the reflected light received from the regions 114, 114' on the retina 116 of the eye 117 of the person by using the measuring device 142 as described above in more detail.

In an optional generating step 220 according to step d), at least one of the individual phase maps is generated, prior to the projecting step 212, by modifying at least one imaging property of the retinal stimuli 112, 112', typically by using the digitally addressable light modulation elements 120, 120' as described above in more detail.

In an optional providing step 222 according to step e), two individual retinal stimuli 112, 112' are provided, prior to both the projecting step 212 and, if applicable, the generating step 220, by using the two displays 122, 122' for generating the two individual phase maps.

In an optional determining step 224 according to step f), at least one value of the ocular aberrations at the at separate regions 114, 114' on the retina 116 of the eye 117 of the person is determined, parallel to the capturing step 216, by using one or both ocular aberrometers 156, 156', typically comprising one or two Hartmann-Shack wavefront sensors (HSWS) 158. For this purpose, at least one light beam may be generated in a further optional IR light generating step 226 according to step g) for being used in determining the at least one value of the ocular aberration, according to the determining step 224, by using the light sources 160, 160' as described above in more detail.

In an optional alignment step 228 according to step h), the alignment of the eye 117 of the person is determined, typically parallel to the projecting step 212, the separating step 214, and the capturing step 216, typically by using the cameras 164, 164' as described above in more detail.

Figure 6:
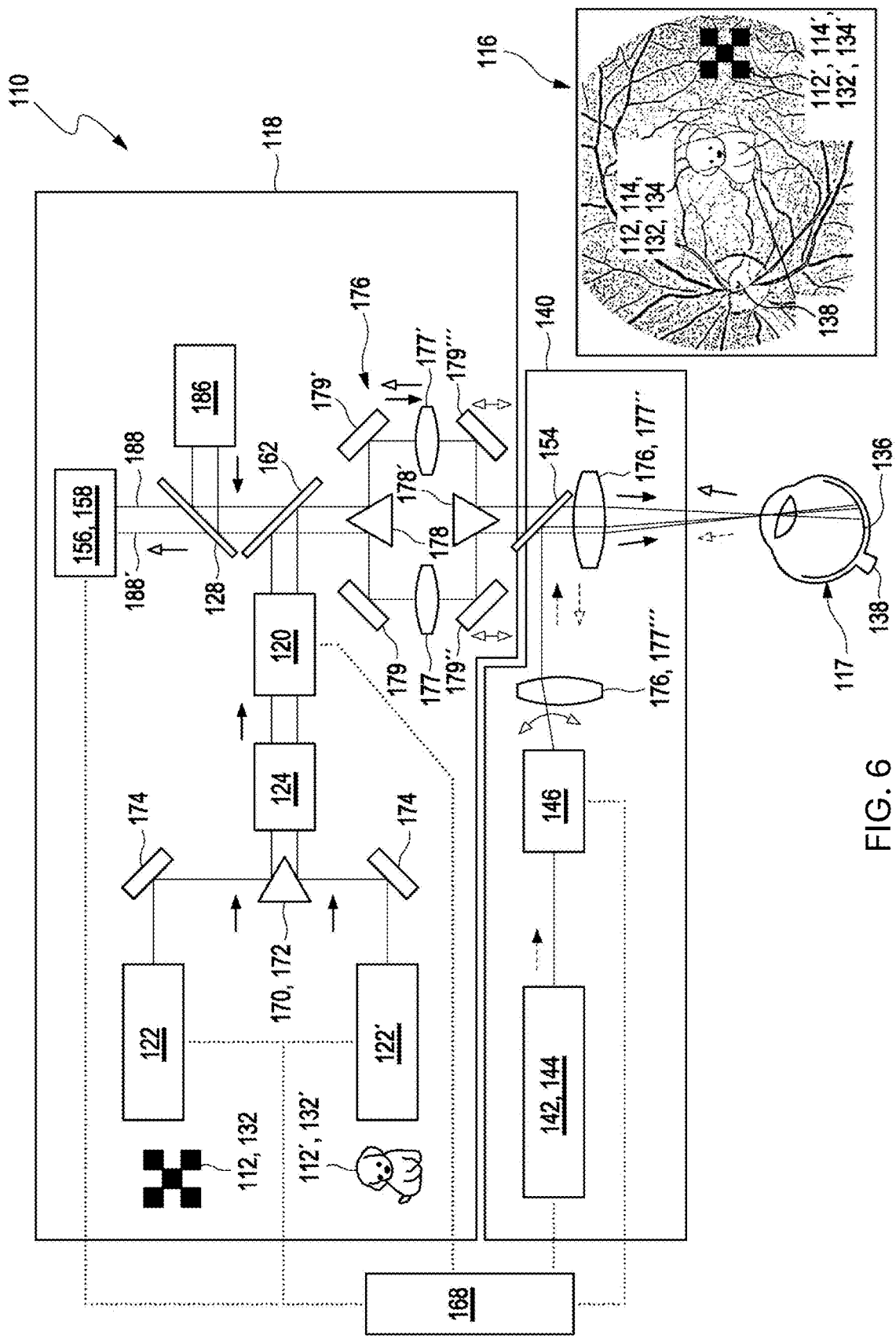
FIG. 6 illustrates a further exemplary embodiment of an apparatus according to the present disclosure.

FIG. 6 illustrates a further exemplary embodiment of the apparatus 110 according to the present disclosure configured for projecting the retinal stimuli 112, 112' to the regions 114, 114' on the retina 116 of the eye 117 of the person and/or for determining the choroidal topography at least over the regions 114, 114' on the retina 116 of the eye 117 of the person, in which a second telescope is shared between the first module 118 and the second module 140. This embodiment comprises four lenses 177, two prisms 178, 178' and four mirrors 179. Herein, the second telescope also functions as the second optical transfer element 176 configured for projecting each of individual phase maps at a different retinal eccentricity to each separate region 114, 114' on the retina 116 of the eye 117 of the person. In the first module 118, the light beams corresponding to each retinal stimulus that are manipulated with the digitally addressable light modulation element 120, typically selected from a spatial light modulator (SLM) or a digital micro-mirror device (DMD), are splatted in different directions by the prism 178. Each light beam is directed to one optical lens 177, 177' by a corresponding mirror 179, 179'. After the light beam passes through the lenses 179, 179', two mobile mirrors 179", 179'" as indicated by respective arrows direct the light beam to the prism 178". After passing by the prism 178', the light beams propagate in a parallel manner separated from each other by a distance given by the two mobile mirrors 179", 179'". Thereafter, the separated light beams pass through the optical lens 177" located in the second module 140 to illuminate the pupil of the eye 117 of the person with different eccentricities. The eccentricity of each light beam is provided by:

$$\arctan(d/f),$$

wherein arctan( ) denotes an inverse tangent function, ƒ a focal length of the optical lens 177" after the dichroic mirror 154 in the second module 140, and d—a distance between a center of the light beam and a center of the optical lens 177". In the second module 140, a further optical lens 177'" located after the scanning device 146 propagates the light beam from the measuring device 142 comprising the optical coherence tomographic system (OCT) 144 parallel to an optical axis of the further optical lens 177'". The dichroic mirror 154 directs the light beam to the optical lens 177", thereby forming the second telescope, which is shared between the first module 118 and the second module 140 of the apparatus 110.

Figure 7:
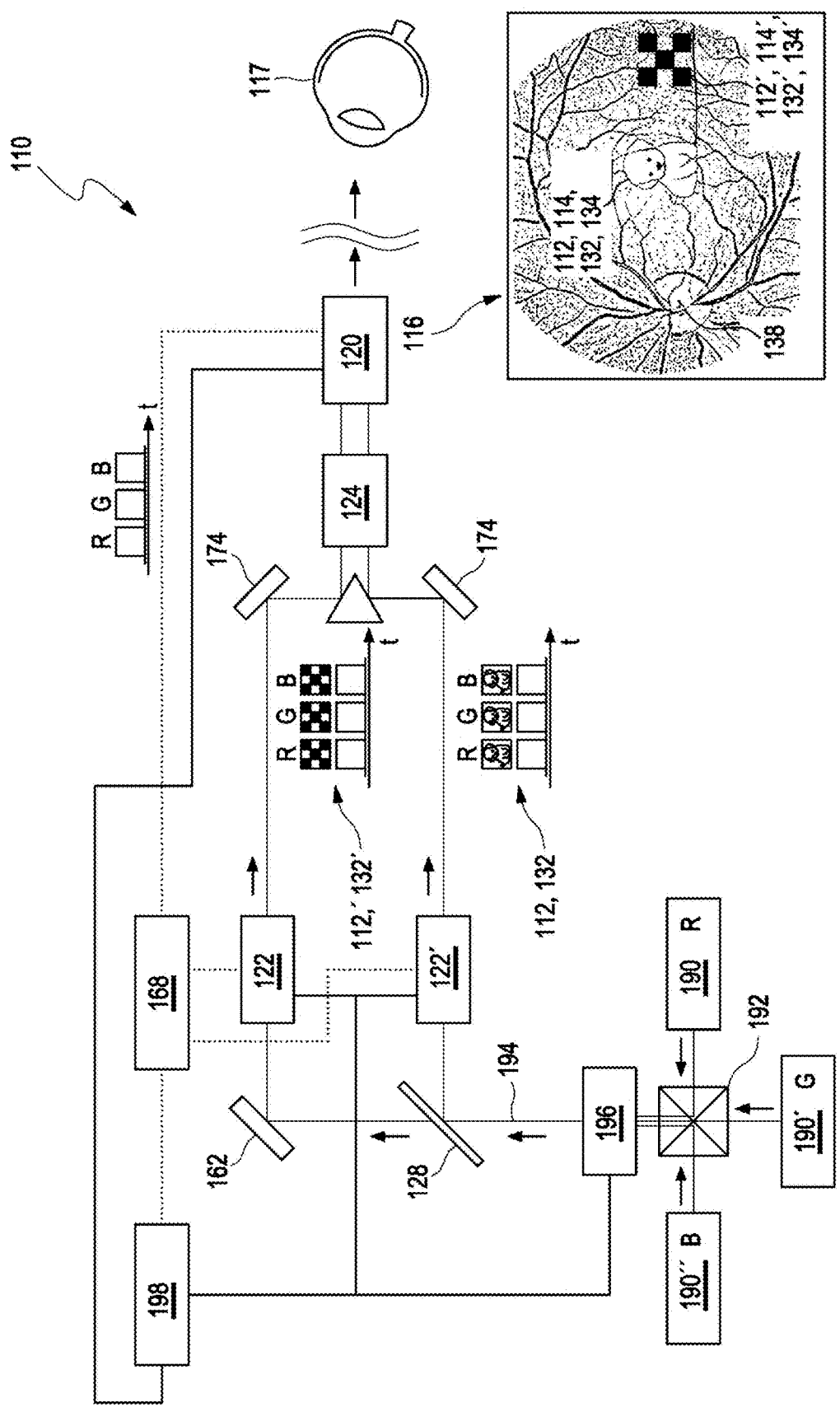
FIG. 7 illustrates another exemplary embodiment of an apparatus according to the present disclosure.

FIG. 7 illustrates a further exemplary embodiment of the apparatus 110 according to the present disclosure configured for projecting the retinal stimuli 112, 112' to the regions 114, 114' on the retina 116 of the eye 117 of the person and/or for determining the choroidal topography at least over the regions 114, 114' on the retina 116 of the eye 117 of the person. This embodiment may be configured to complement all described embodiments to project multiple chromatic retinal stimuli 112, 112' having independent image properties at different wavelengths. For this purpose, the multiple chromatic retinal stimuli 112, 112' are generated and combined via temporal multiplexing. As schematically depicted in FIG. 7, the multiple chromatic retinal stimuli 112, 112' may, typically, be generated by using one or more laser devices 190, 190', 190", typically laser diodes, having wavelengths of red (R), green (G), and blue (B). However, using a different type of device for generating the multiple chromatic retinal stimuli 112, 112' and/or other wavelengths may also be conceivable. For each retinal eccentricity, one display per wavelength or one display for all wavelengths can be used to shape the stimuli. In the exemplary embodiment of FIG. 7, each display 122, 122' is configured to emit the retinal stimuli 112, 112' for all wavelengths of red (R), green (G), and blue (B). The display 122, 122' may, typically, be selected from liquid crystal-based, digital micromirror-based displays; however using a different type of display may also be feasible.

A trichroic prism 192 guides the monochromatic light beams along a common path 194. A variable filter 196 can be used to branch out a portion of the monochromatic light beams to a synchronization device 198, which is configured to drive a sequence of a monochromatic illumination over time t centered at each wavelength. Further, the synchronization device 198 is configured to trigger the displays 122, 122' and the digitally addressable light modulation element 120, typically selected from a spatial light modulator (SLM) or a digital micro-mirror device (DMD), to project an intensity map of the multiple chromatic retinal stimuli 112, 112' and a corresponding phase map which is configured to modify its image properties for each wavelength. A dependency of a performance of the digitally addressable light modulation element 120 on the wavelength can be adjusted by projecting the phase map optimized to each wavelength after calibrating the phase modulation of the digitally addressable light modulation element 120 at each wavelength. Especially in a liquid-crystal-based SLM, the phase modulation refers to a phase delay induced by a voltage applied to the liquid crystal cells. This voltage can be addressed through gray levels which may be programmed in a video card of the processing device 168.

The foregoing description of the exemplary embodiments of the disclosure illustrates and describes the present invention. Additionally, the disclosure shows and describes only the exemplary embodiments but, as mentioned above, it is to be understood that the disclosure is capable of use in various other combinations, modifications, and environments and is capable of changes or modifications within the scope of the concept as expressed herein, commensurate with the above teachings and/or the skill or knowledge of the relevant art.

The term "comprising" (and its grammatical variations) as used herein is used in the inclusive sense of "having" or "including" and not in the exclusive sense of "consisting only of." The terms "a" and "the" as used herein are understood to encompass the plural as well as the singular.

All publications, patents and patent applications cited in this specification are herein incorporated by reference, and for any and all purposes, as if each individual publication, patent or patent application were specifically and individually indicated to be incorporated by reference. In the case of inconsistencies, the present disclosure will prevail.

LIST OF REFERENCE SIGNS 110 apparatus
112, 112' retinal stimulus
114, 114' region
116 retina
117 eye
118 first module
120 digitally addressable light modulation element
122, 122' display
124, 124' first optical relay system
126, 126' optical transfer elements
128, 128' beam splitter
130, 130' second optical relay system
132 central retinal stimulus
132' peripheral retinal stimulus
134 first separate region
134' second separate region
136 fovea
138 optic nerve
140 second module
142 measuring device
144 optical coherence tomographic system (OCT)
146 scanning device
148, 148', 148" telescope
150, 150' parabolic mirror
152 optical filter
154 dichroic mirror
156, 156' ocular aberrometer
158, 158' Hartmann-Shack wavefront sensor (HSWS)
160, 160' light source
162, 162' cold mirror
164, 164' camera
166, 166' IR light-emitting diode
168 processing device
170 third optical transfer element
172 first single prism
174, 174' mirrors
176 second optical transfer element
177, 177' optical lens (in first module)
177", 177'" optical lens (in second module)
178, 178' second prism
179, 179' mirrors
179", 179'" mobile mirrors
180 rotational beam splitter (RBS)
182 wide field-of-view (FOV) stimulus
184 non-pixelated correcting element
186 infrared diode laser
188, 188' infrared light beams
190, 190', 190" laser device
192 trichroic prism
194 path
196 variable filter
198 synchronization device
210 method
212 projecting step
214 separating step
216 capturing step
218 choroidal topography
220 generating step
222 providing step
224 determining step
226 IR light generating step
228 alignment step

The invention claimed is:

1. An apparatus configured for determining a choroidal topography over a region on a retina of a same of a person, the apparatus comprising:
at least two optical transfer elements, including a first optical transfer element and a second optical transfer element, each optical transfer element being configured to project at least one of a retinal stimulus or a phase map to the region on the retina of the eye of the person, wherein the phase map contains a modified retinal stimulus;
a measuring device to capture the choroidal topography over the region on the retina of the eye of the person by using reflected light received from the region on the retina of the eye of the person; and
an optical filter configured to separate the reflected light received from the region on the retina of the eye of the person from the phase map projected to the region on the retina of the eye of the person,
wherein the apparatus further comprises:
at least two individual displays, each display being configured to provide the retinal stimulus, thereby providing two independent retinal stimuli,
wherein the second optical transfer element is further configured to simultaneously project each of the at least two individual phase maps at a different retinal eccentricity to each of at least two separate regions on the retina of the eye of the person, and
wherein the separate regions include a peripheral region and a foveal region on the retina of the eye of the person.

2. The apparatus according to claim 1, wherein the second optical transfer element is or comprises at least one of a mirror, a beam splitter, a rotational beam splitter, or a diffractive element.

3. The apparatus according to claim 2, wherein the second optical transfer element is the rotational beam splitter.

4. The apparatus according to claim 3, further comprising:
at least one telescope configured to guide each of the at least two individual phase maps to the respective separate regions on the retina of the eye of the person.

5. The apparatus according to claim 1, further comprising:
a scanning device configured to change a direction of an optical axis with regard to the retina of the eye of the person.

6. An apparatus configured for determining a choroidal topography over a region on a retina of a same of a person, the apparatus comprising:
at least two optical transfer elements, including a first optical transfer element and a second optical transfer element, each optical transfer element being configured to project at least one of a retinal stimulus or a phase map to the region on the retina of the eye of the person, wherein the phase map contains a modified retinal stimulus;
a measuring device to capture the choroidal topography over the region on the retina of the eye of the person by using reflected light received from the region on the retina of the eye of the person; and
an optical filter configured to separate the reflected light received from the region on the retina of the eye of the person from the phase map projected to the region on the retina of the eye of the person,
at least two individual displays, each display being configured to provide the retinal stimulus, thereby providing two independent retinal stimuli, wherein the second optical transfer element is further configured to simultaneously project each of the at least two individual phase maps at a different retinal eccentricity to each of at least two separate regions on the retina of the eye of the person, and wherein the separate regions include a peripheral region and a foveal region on the retina of the eye of the person; and at least one digitally addressable light modulation element configured to generate the at least two individual phase maps by modifying at least one imaging property of the at least two retinal stimuli.

7. The apparatus according to claim 6, further comprising:
a single digitally addressable light modulation element configured to generate at least two of the individual phase maps.

8. The apparatus according to claim 7, further comprising:
a third optical transfer element configured to provide at least two individual retinal stimuli to the single digitally addressable light modulation element.

9. The apparatus according to claim 6, further comprising:
at least two digitally addressable light modulation elements, wherein each of the at least two digitally addressable light modulation elements is assigned for each of the retinal stimulus and is configured to generate an individual phase map, respectively.

10. The apparatus according to claim 1, wherein the individual display for providing the retinal stimulus to the foveal region of the retina of the eye is configured to provide a wide field-of-view stimulus.

11. The apparatus according to claim 10, further comprising:
at least one non-pixelated correcting element configured to generate a phase map by modifying image properties of the wide field-of-view stimulus.

12. A method of projecting a retinal stimulus, the method comprising:
Providing the apparatus according to claim 1 for determining an effect of at least one ophthalmic lens design on a choroidal topography.

13. A method for determining a choroidal topography over a region on a retina of a same eye of a person, the method comprising the following steps:
a) projecting a phase map to a region on the retina of the eye of the person by using at least one optical transfer element, wherein the phase map comprises a modified retinal stimulus;
b) separating reflected light received from the region on the retina of the eye of the person from the phase map projected to the region on the retina of the eye of the person by using an optical filter; and
c) capturing a choroidal topography over the region on the retina of the eye of the person by using the reflected light received from the region on the retina of the eye of the person by using a measuring device; and
d) providing at least two independent retinal stimuli by using at least two individual displays, respectively, and simultaneously projecting each of at least two individual phase maps at a different retinal eccentricity to each of at least two separate regions on the retina of the eye of the person, wherein the at least two separate regions comprise a peripheral region and a foveal region on the retina of the eye of the person.

14. A method for determining a choroidal topography over a region on a retina of a same eye of a person, the method comprising the following steps:
a) projecting a phase map to a region on the retina of the eye of the person by using at least one optical transfer element, wherein the phase map comprises a modified retinal stimulus;
b) separating reflected light received from the region on the retina of the eye of the person from the phase map projected to the region on the retina of the eye of the person by using an optical filter;
c) capturing a choroidal topography over the region on the retina of the eye of the person by using the reflected light received from the region on the retina of the eye of the person by using a measuring device;
d) providing at least two independent retinal stimuli by using at least two individual displays, respectively, and simultaneously projecting each of at least two individual phase maps at a different retinal eccentricity to each of at least two separate regions on the retina of the eye of the person, wherein the at least two separate regions comprise a peripheral region and a foveal region on the retina of the eye of the person;
e) generating at least one of the individual phase maps by modifying at least one imaging property of the retinal stimulus by using a digitally addressable light modulation element;
f) determining at least one value of an ocular aberration at the at least two separate regions on the retina of the eye of the person by using reflected light received from the at least two separate regions on the retina of the eye of the person by using at least one ocular aberrometer;
g) generating at least one light beam used in determining the at least one value of the ocular aberration by using at least one light source; or
h) determining an alignment of the eye of the person by using at least one camera.

* * * * *